United States Patent

Iwasaki et al.

[11] Patent Number: 5,996,606
[45] Date of Patent: *Dec. 7, 1999

[54] FOUR-PORT VALVE AND THREE-WAY VALVE

[75] Inventors: Masahiro Iwasaki, Osaka; Yasuo Akedo, Wakayama, both of Japan

[73] Assignee: Kurimoto, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/129,200

[22] Filed: Jul. 28, 1998

[51] Int. Cl.$^6$ ............................. F16K 11/02; E03B 7/02
[52] U.S. Cl. .................. 137/110; 137/492; 137/492.5; 137/625.29; 137/625.49
[58] Field of Search .................. 137/625.29, 625.49, 137/110, 492, 492.5

[56] References Cited

U.S. PATENT DOCUMENTS

| | | | |
|---|---|---|---|
| 2,553,458 | 5/1951 | Jordan | 137/625.29 |
| 2,969,811 | 1/1961 | Freeman | 137/627.5 |
| 3,643,692 | 2/1972 | Traylor | 137/625.29 X |
| 3,977,433 | 8/1976 | Hankison et al. | 137/625.29 |
| 4,250,920 | 2/1981 | Traylor | 137/625.29 |
| 4,469,131 | 9/1984 | Traylor | 137/625.29 X |

*Primary Examiner*—Gerald A. Michalsky
*Attorney, Agent, or Firm*—Wenderoth, Lind & Ponack, L.L.P.

[57] ABSTRACT

A four-port changeover valve in an emergency water storage tank facility for changing over the flow paths of the water main and to the tank by axially moving the valve rod. Three valve seats are formed axially in a valve box. The valve rod extends through the valve seats. As the four-port changeover valve, the three valve seats can be selectively opened and closed by one and the other of two valve bodies. The water storage tank is connected to a first and a fourth chamber, while the water main is connected to a second and a third chamber. The valve rod is raised and lowered by the cylinder. In a normal state when the water pressure in the water main is at a required level, the valve rod rises so that the tank and the water main communicate with each other. In an emergency when the water pressure is low, the valve rod is pushed down by a spring, so that the one valve body is pressed against the first valve seat, while the other valve body separates from the second valve body and is seated on the third valve body. The tank is thus shut off from the water main. Also, a three-way valve for operating the changeover valve is proposed which eliminates an unstable state in which the flow direction cannot be changed over.

8 Claims, 17 Drawing Sheets

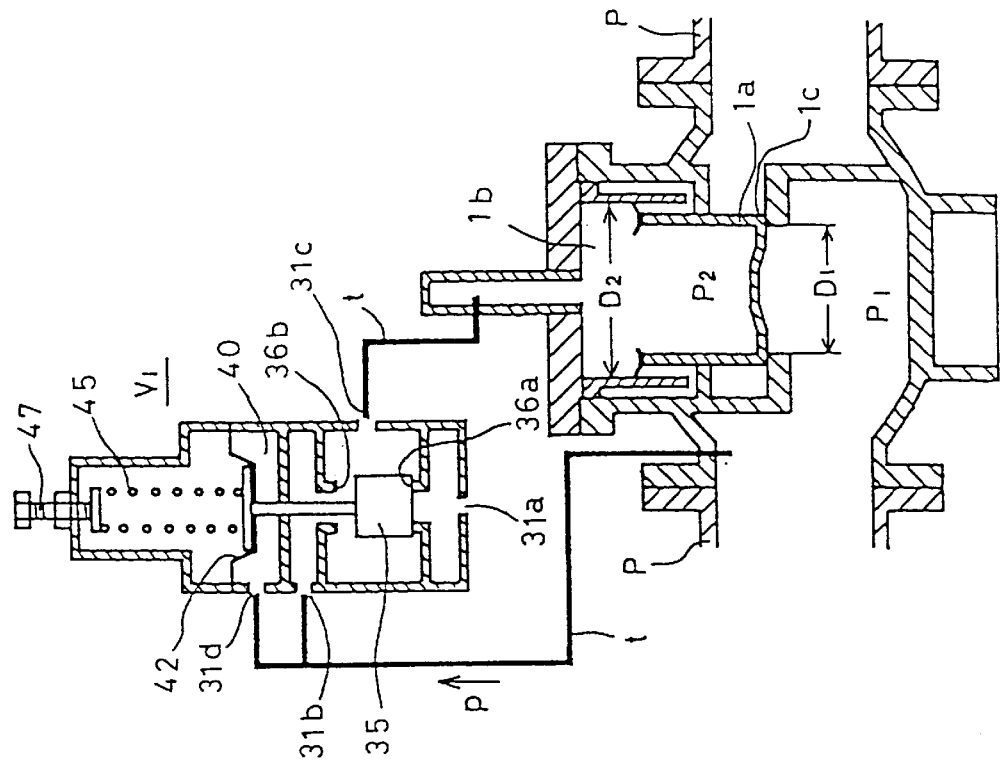
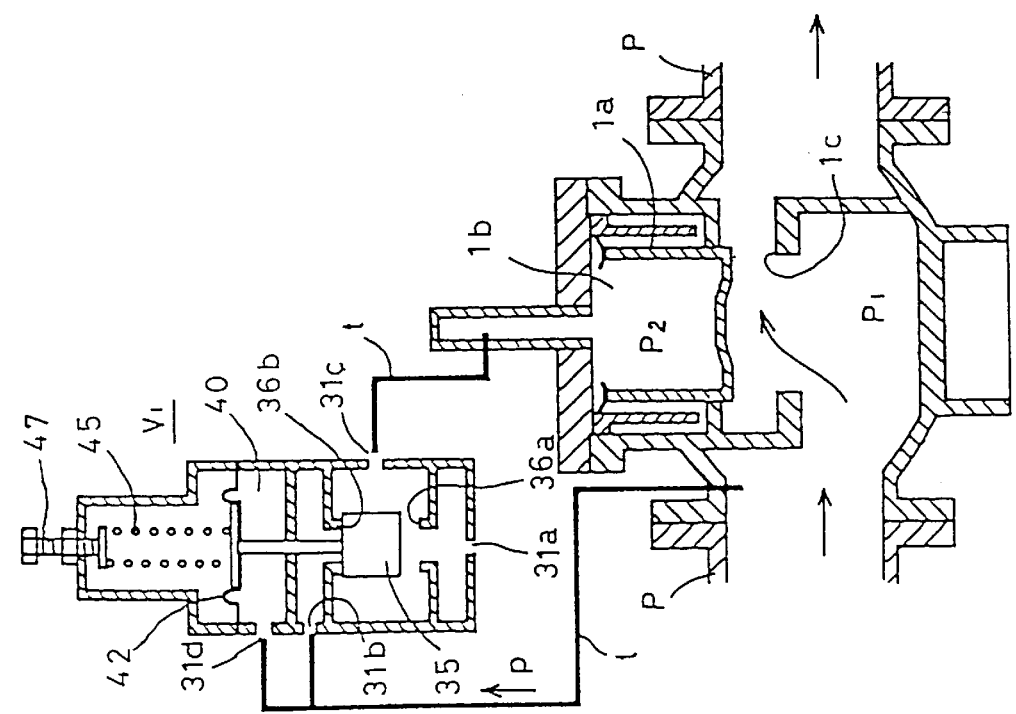

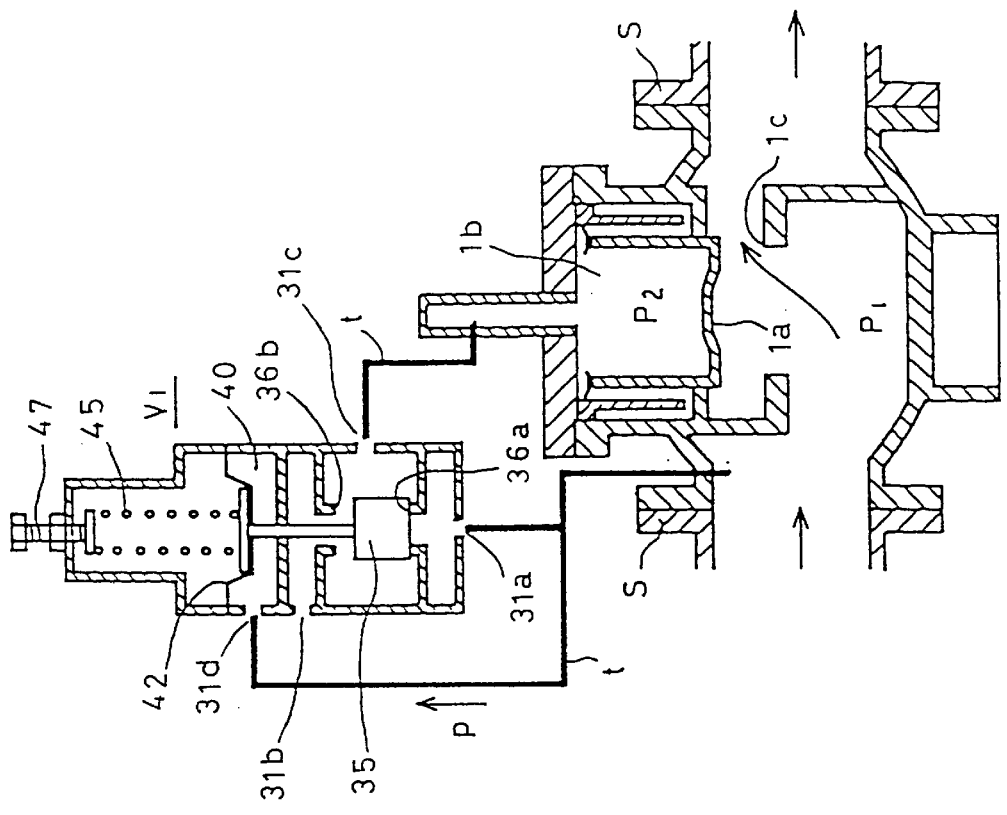
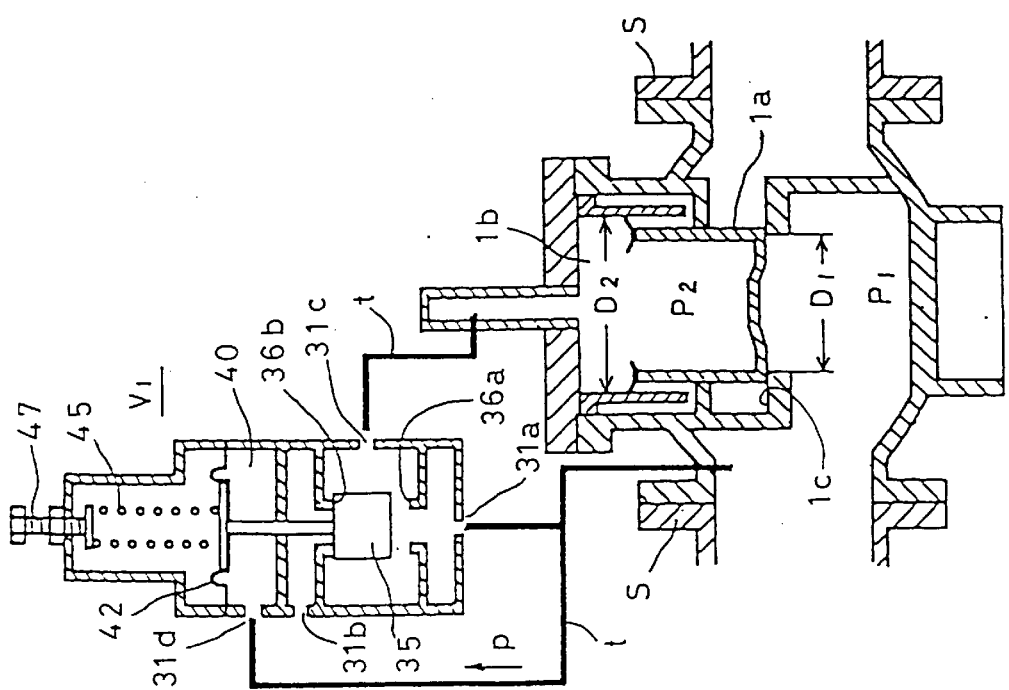

FOUR-PORT VALVE AND THREE-WAY VALVE

BACKGROUND OF THE INVENTION

This invention relates to a flow passage changeover valve assembly provided in a pipeline connecting an emergency water storage tank for use in emergency cases such as earthquakes with the water main for changing the course of water flow, and a four-port changeover valve and a three-way valve used in such a valve assembly.

Emergency water storage tanks are buried under roads, schoolyards, parks, etc. to supply water to neighboring residents or for fire-extinguishing purposes in the case of earthquakes and other disasters.

As shown in FIG. 14, such a tank T is connected to the water main S through inlet and outlet bypass lines P each provided with an emergency shutoff valve 1. An on-off valve 2 adapted to be opened in an emergency case is provided in the water main S between the bypass lines P. The tank T has a fireplug 3, a manual pump 4 and an air valve 5.

In a normal situation, the shutoff valves 1 are open and the on-off valve 2 is closed. Water thus flows as shown by arrows A–D to fill the tank and also to prevent rotting of water in the tank. In the case of an emergency such as an earthquake, the shutoff valve 1 is closed and the on-off valve 2 is opened to shut off the tank T from the water main S, thus preventing escape of water from the tank T due to the siphoning effect, while maintaining the water flow through the water main S.

A four-port butterfly valve having all the functions of the shutoff valves 1 and the on-off valve 2 is disclosed in unexamined Japanese utility model publication 6-59673 and unexamined Japanese patent publication 64-21275.

As shown in FIG. 15, such a butterfly valve v has its two ports connected to bypass lines P and the remaining two ports to the mains S. In a normal situation, its valve body 7 is positioned as shown by chain line to let water flow as shown by arrows A–D. In an emergency, the valve body 7 is moved to the position shown by solid line to shut off the bypass line P from the water main S.

The arrangement in which two shutoff valves 1 and one on-off valve 2, a total of three valves, are used is not only uneconomical but also its maintenance is troublesome. The three valves tend to fail more frequently and thus is less reliable than a single valve. Further, operating the three valves 1 and 2 either simultaneously or in sequence is three times as troublesome as operating a single valve. Also, the three valves take up three times as much installation space as a single valve.

The arrangement in which the single butterfly valve V is used is free of any of these problems. But this valve has a problem in that since the valve body 7 is turned to open and close the valve, a large housing is needed to turn the valve body. To open and close the valve with high accuracy, the valve body has to be turned by a predetermined angle very accurately. Water sealability by the pressure contact of the rotary valve body 7 against the valve seal is insufficient.

In the arrangement of FIG. 14, various techniques are known in which water pressure in the water main S is used to control the shutoff valves 1 and the on-off valve 2. One of these techniques is disclosed in registered Japanese utility model publication 3018335. Another similar conventional arrangement is shown in FIG. 16, which includes an emergency shutoff valve 1 and an on-off valve adapted to be opened in an emergency, each valve having two pilot valves 8 and 9.

The shutoff valve 1 is provided in a bypass line P and its return-to-normal and shutoff pilot valves 8 and 9 each comprise a diaphragm 8a, 9a, a spring 8b, 9b biasing the diaphragm 8a, 9a, a valve body 8c, 9c coupled to the diaphragm through a valve rod, and its valve seat 8d, 9d. In a normal situation, in which water main pressure is below a predetermined level, the water main pressure is applied to both pilot valves 8 and 9, so that the springs 8b, 9b are compressed by the diaphragms 8a, 9a, and the valve body 8c separates from the valve seat 8d, while the valve body 9c is pressed against the valve seat 9d, thus keeping the water main pressure from acting on the cylinder valve 1a of the emergency shutoff valve 1. In this state, the inner and outer pressures P1 and P2 satisfy the relation P1>P2, so that the cylinder valve 1a separates from the valve seat 1c. The shutoff valve 1 thus opens.

If the water main pressure drops below the biasing force of the springs 8b and 9b due e.g. to an earthquake, as shown in FIG. 16B, the pilot valve body 8c of the pilot valve 8 is pressed against the valve seat 8d, while the valve body 9c of the pilot valve 9 separates from the valve seat 9d, under the force of the springs 8b and 9b, respectively. Water main pressure is thus applied in the cylinder 1b (P1≈P2). The diameter D1 of the valve seat of the emergency shutoff valve 1 is smaller than the diameter D2 of the cylinder 11 (D1<D2). Thus, in this state, the relation is met, so that the cylinder valve 1a is seated on the valve seat 1c, thus closing the pipe P.

The two pilot valves 8 and 9 used in this emergency water storage tank structure need a large installation space, make the arrangement of connecting pipes t complicated, increase the facility cost, and are more likely to fail.

In the conventional arrangement of FIG. 17, a three-way valve is used instead of the pilot valves 8, 9. This valve V has, as shown in the figure, a valve chest 100 having opposed first and second ports 101, 102, and a third port 103 between the ports 101 and 102. The edges of the openings of the ports 101 and 102 serve as first and second valve seats 101a and 102a on which a valve body 104 is adapted to be selectively seated by means of a valve rod 105 (as shown by solid and chain line in FIG. 17A) to change the flow direction by selectively communicating first port 101 with third port 103 or second port 102 with third port 103.

But in this three-way valve, when the valve body 104 separates from the first valve seat 101a or the second valve seat 102a, as shown in FIG. 17B, the valve body 104 communicates the third port 103 with both the first and second ports 101 and 102. Thus, if this three-way valve V is used as a pressure-responsive pilot valve, communication from the first port 101 to the ports 102 and 103 become unstable because no flow direction changeover is possible. This lowers the reliability of changeover operation. For example, in the above emergency water storage tank structure, a reliability problem arises because the changeover by the emergency shutoff valve 1 and the on-off valve 2 cannot be carried out reliably. Especially if the water pressure in the water main P changes slowly, or if its change stops near the changeover setting pressure, the above instability state is created.

Using two pilot valves 8, 9 needs adjustment of their set pressures. The adjustment therefor is troublesome and if there is anything wrong in the adjustment, no desired action will be possible. That is, if only the set pressure of the return-to-normal pilot valve 8 is too low, i.e. 4 kg/cm$^2$ due to weak pressure of the spring 8b, in spite of the fact that the set pressures of both pilot valves 8, 9 have to be 5 kg/cm$^2$, when pressure in the pipe P drops from a normal pressure to the set pressure (5 kg/cm$^2$), the shutoff pilot valve 9 will operate normally (from close to open), thus supplying pressurized water in the pipe P into the cylinder 1b. But the return-to-normal pilot valve 8 does not operate (remains open) because the water pressure is still higher than its set pressure 4 kg/cm$^2$. Thus, even when pressurized water is supplied, it is simply discharged. Thus, although the pressure in the cylinder 1b may rise a little, it will never rise to a predetermined pressure, so that the cylinder valve 1a cannot be seated on the valve seat 1c reliably, and since the shutoff valve 1 is not closed completely, upstream water will keep leaking to the downstream side of the valve 1.

At this time, the pressure in the cylinder 1b is determined by the difference between the supply and discharge pressures of pressurized water. Since the fluid pressure (water pressure) in the pipe P, flow rate, degree of opening of the valve (cylinder valve 1a), etc. change, the degree of opening of the valve and the like cannot be kept constant and tend to be unstable. The amount of leakage to the downstream side is also unstable. The pipelines are thus unstable. Such an unstable state may also occur if there is a difference in length between the connecting pipes t of both valves 8, 9. Thus, the set pressures of both valves 8, 9 have to be determined taking into account the length and leakage of the connecting pipes t. Such adjustments are troublesome.

On the other hand, if the set pressure of the shutoff pilot valve 8 is too low, e.g. 4 kg/cm$^2$, even if the water pressure in the pipe P drops to 5 kg/cm$^2$ and the return-to-normal pilot valve 8 is closed, the shutoff pilot valve 9 will remain inactive (closed) and no pressurized water is supplied into the cylinder 1b. In this case too, the shutoff valve 1 will not close but remain in an unstable open state.

In both these unstable states, the water pressure in the pipe P will further decrease to 4 kg/cm$^2$. At this point, the return-to-normal pilot valve 8 or the shutoff pilot valve 9 is activated (opens). Pressurized water is thus entirely applied in the cylinder 1b, so that the shutoff valve 1 stabilizes and is closed reliably.

An object of this invention is to provide a four-port changeover valve for changing over the flow path of the water main and the bypass pipe by axially moving the valve rod.

A second object of the invention is to eliminate an unstable state in which the flow direction cannot be changed over due to flows in two directions.

A third object is to provide, in a flow changeover valve assembly in an emergency water storage tank facility, means that make it possible to change over the flow path by the pilot pressure.

A fourth object is the provision of a pilot valve which eliminates the need for correlation between the preset pressures, which does not need a long, complicated piping, and which is easy to adjust the pressure and is less liable to fail.

SUMMARY OF THE INVENTION

According to this invention, there is provided a four-port changeover valve comprising a valve box, a valve rod axially slidably mounted in the valve box, three partitioning walls provided across the valve rod at three axial points of the valve rod to divide the interior of the valve box into axially arranged first to fourth chambers each formed with a port, the partitioning walls each being formed with a hole through which the valve rod extends, a first valve seat provided along the edge of a first hole through which the first and second chambers communicate with each other, a second valve seat provided along the edge of a second hole through which the second and third chambers communicate with each other, a third valve seat provided along the edge of a third hole through which the third and fourth chambers communicate with each other, a pair of valve bodies fixedly provided on the valve rod for opening and closing the holes by coming into and out of contact with the first to third valve seats, the valve bodies being arranged such that when they abut the first and third valve seat, they are separate from the second valve seat, and when they abut the second valve seat, they are separate from the first and third valve seats.

By the axial movement of the valve rod, the four-port changeover valve can assume two positions, i.e. a first position in which the valve bodies are seated on the first and third valve seats while separating from the second valve seat, thus shutting off communication between the first and fourth chambers and opening communication between the second and third chambers, and a second position in which one of the valve bodies is seated on the second valve seat with neither of the valve bodies seated on the first and third valve seats, thereby opening communication between the first and second chambers and between the third and fourth chambers.

In the above-mentioned four-port valve, one of the valve bodies may be so arranged as to selectively abut and separate on and from said second and third valve seats.

In this arrangement, one valve body is omitted. This permits downsizing of the valve box and thus the entire valve.

In the above-mentioned four-port valve, the valve body adapted to come into and out of contact with the second valve seat may be small enough to pass through the first valve seat, and the valve body adapted to come into and out of contact with the third valve seat may be small enough to pass through the first and second valve seats.

With this arrangement, all the valve bodies can be inserted into the valve box from the side of the first valve seat. Packings (seals) of the valve bodies can thus be replaced easily. That is, maintenance is easy.

In order to provide a four-port changeover valve in an emergency water storage tank, the bypass pipe may be connected to the first chamber and the fourth chamber, and the water main connected to the second and third chambers, the valve box having a cylinder in which is inserted the valve rod, a piston being provided in the cylinder in operative association with the valve rod, a spring being provided to urge the piston such that one of the valve bodies separates from the second valve seat and the valve bodies are pressed against the first and third valve seats, and the piston being urged in a direction against the force of the spring by water pressure in the water main, whereby in a normal situation when the water pressure in the water main is high, the valve bodies are separated from the first and third valve seats, and one of the valve bodies is pressed against the second valve seat by the water pressure, and in an emergency when the water pressure in the water main is low, the valve bodies are pressed by the spring against the first and third valve seats and one of the valve bodies is separated from the second valve seat.

With this arrangement, the valve rod is moved automatically by the water main pressure transmitted and by the bias of the spring between the above-described two positions, i.e. normal-state and emergency positions. Even if the water pressure temporarily drops to an emergency level, the valve rod will automatically return to the normal position as soon as the water pressure returns to normal, so that water in the tank will keep on flowing and will never rot.

The cylinder may be provided with a pilot valve to introduce water pressure in the water main into the cylinder in a normal state and to stop introduction of water pressure in the water main into the cylinder in an emergency.

The pilot valve ensures stable movement of the piston in response to the water main pressure.

In order to achieve the second object, the valve body of the three-way valve may be split into two split members substantially at its center with respect to the direction of movement thereof, one of the split members being adapted to abut one of the valve seats when the other of the split members is separate from the other of the valve seats.

In this arrangement, the second port is prevented from communicating with both the first and third ports simultaneously. This permits clear flow direction changeover (ON-OFF).

The split members may be slidably mounted on a valve rod inserted in the valve chest, wherein a spring is provided between the split members to urge them away from each other, wherein the valve rod has a pair of engaging portions for limiting the sliding movement of the split members in a direction away from each other, and wherein the distance between the engaging portions is greater than the distance between the valve seats.

In this arrangement, the split members are moved by the spring away from each other until they engage the engaging portions or valve seats. Since the distance between the engaging portions is greater than the distance between the valve seats, while the valve rod is moving from the first position in which one of the split members are seated on one valve seat toward the second position in which the other split member is seated on the other valve seat, the one split member is kept seated on the one valve seat at least until the other split member is seated on the other valve seat. That is, at least one split member is always seated on the corresponding valve seat. When the valve rod is moved further from the second position, the one split member separates from the one valve seat pushed by the corresponding engaging portion, thus opening the corresponding port.

In order to achieve the third object, the above-mentioned three-way valve, is adopted as a pressure-responsive pilot valve, and a valve box forming the valve chest carries a cylinder in which is inserted the valve rod, wherein a diaphragm is provided in the cylinder so as to operate in association with the valve rod, wherein a pilot pressure is applied to the diaphragm, wherein a spring is provided to urge the diaphragm in a direction opposite to the direction in which the pilot pressure is applied to the diaphragm, wherein the valve body is alternately brought into and out of contact with the valve seats by axially moving the valve rod through the diaphragm by the pilot pressure or by the spring.

The pressure-responsive pilot valve adjusts the pilot pressure when the valve bodies move into and out of contact with the valve seats by the adjustment of the force of the spring. This pilot pressure is used as the changeover pressure for opening and closing the flow passage between the first and second ports and the flow passage between the second and third ports. That is, it is possible to simultaneously change over the opening and closing of both passages. Thus, by using both passages as passages for opening and closing the return-to-normal and shutoff pilot valves, a single valve can perform the functions of both valves.

The valve box forming said valve chest may be split into a first piece having a first port and a second piece having a second and a third port, the second piece being open at a surface opposite the second port, the first piece abutting the open surface to close it.

With this arrangement, each piece can be manufactured easily. A valve box can be formed by bolting two pieces together with a seal disposed between. It can be assembled easily. The valve bodies are moved in a straight line between the first and second valve seats and pressed against the valve seats to open and close them. Its movement is reliable and sealability is good.

In order to achieve the fourth object, a water main is connected to an emergency water storage tank through a bypass pipe, and a flow changeover valve is provided between the water main and the bypass pipe to open and close communication therebetween, thereby creating a first state in which water flowing through the water main flows through the bypass pipe and a second state in which it does not flow, the flow changeover valve is provided with a pressure-responsive pilot valve and the flow changeover valve is operated by the pilot valve using the water pressure in the water main as the pilot valve.

If the flow changeover valve is e.g. the shutoff valve 16 of FIG. 16, the pipe pressure is introduced into the first or third port, while the second port is connected to the cylinder 1b with the third or first open open to open and close both valve seats by moving valve bodies under the pilot pressure (pipe pressure), thereby changing over the application of pipe pressure to the interior of the cylinder to activate the flow changeover valve.

In the flow changeover valve assembly, the bypass valve is connected to the first and fourth chambers and the water main is connected to the second and third chambers, and the piston in the cylinder is operated by application of the pilot pressure through the pilot valve, whereby in a normal state when the water pressure is high, the valve bodies are separated from the first and third valve seats, and the one of the valve bodies is pressed by the spring against the second valve seat by the water pressure, and in an emergency when the water pressure is low, the valve bodies are pressed against the first and third valve seats and the one of the valve bodies is separated from the second valve seat.

With this arrangement, the water main pressure is introduced into the pilot port and the first port of the pressure-responsive pilot valve, and the second port is connected to the cylinder of the flow changeover valve with the third port open to the outer air. With this piping arrangement, the water main pressure is applied to the interior of the cylinder by the pilot valve due to the above function. Thus, the valve rod of the flow changeover valve is moved automatically through the piston to selectively assume the above two positions, i.e. normal and emergency positions. Even if the water pressure temporarily drops to an emergency level, the valve rod will return to the normal position as soon as the water pressure returns to normal, so that water in the tank will keep on flowing and will never rot.

BRIEF DESCRIPTION OF THE DRAWINGS

Other features and objects of the present invention will become apparent from the following description made with reference to the accompanying drawings, in which:

FIGS. 7A and 7B are simplified views of the embodiment of FIG. 4;

FIG. 12 is a sectional view of the assembly including the valve of FIG. 16 used as the shut-off valve and the pilot valve of FIG. 7;

FIG. 13 is a sectional view of the assembly including the valve of FIG. 16 used as an on-off valve and the pilot valve of FIG. 7;

DETAILED DESCRIPTION OF THE PREFERRED EMBODIMENT

Figure 1:
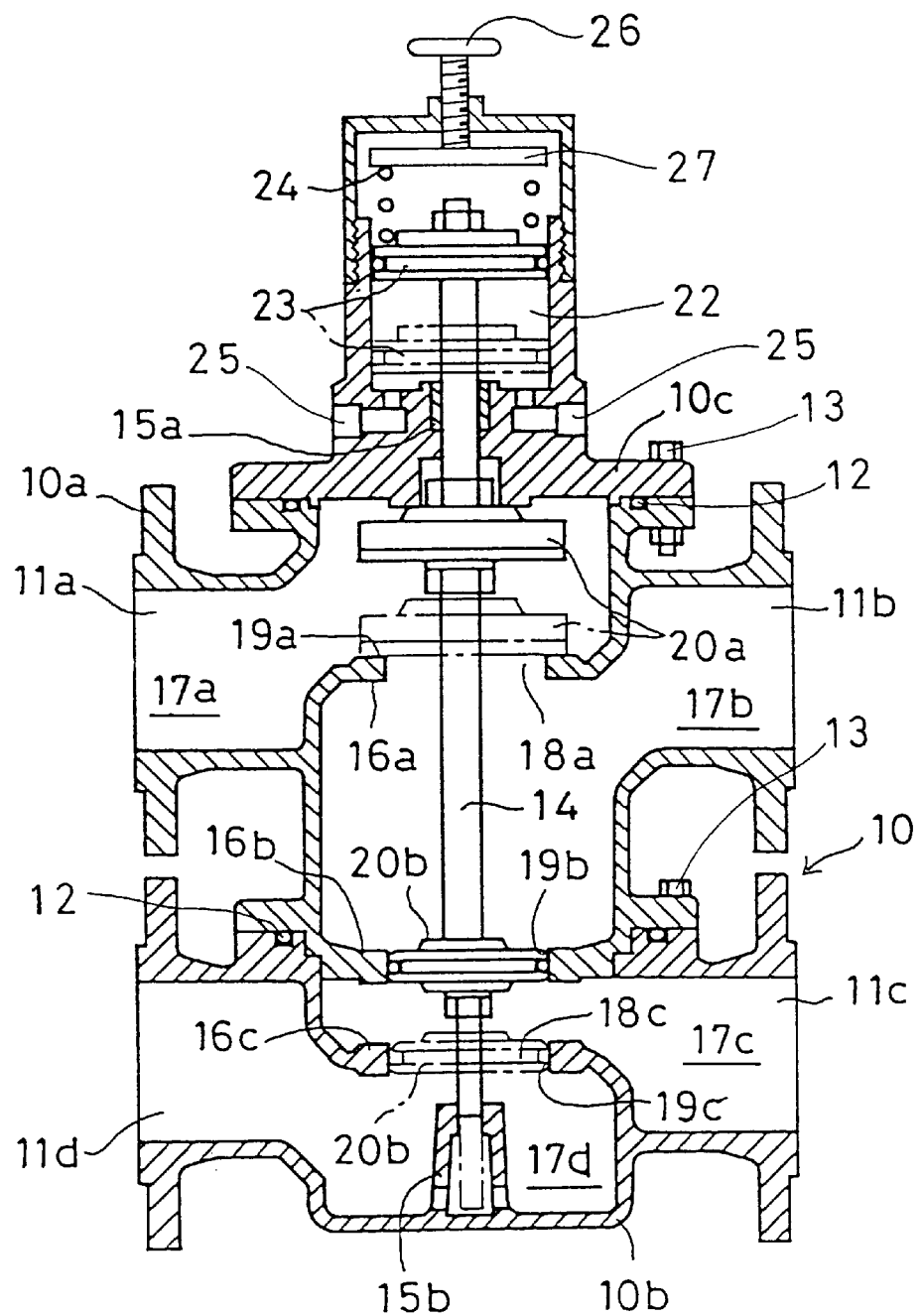
FIG. 1 is a sectional view of one embodiment of the four-port changeover valve.

FIG. 1 shows a four-port changeover valve embodying the invention. In this figure, numeral 10 designates a valve box comprising a first split member 10a having a first port 11a and a second port 11b, a second split member 10b having a third port 11c and a fourth port lid, and a lid 10c for the first split member 10a. The split members 10a and 10b, and the first split member 10a and the lid 10c are coupled together by bolts 13 with packings (or seals) 12 sandwiched therebetween. The bolts 13 are arranged at angular intervals.

A valve rod 14 is inserted through center of the valve box 10. It is axially movably supported by bearings 15a and 15b mounted on the lid 10c and the bottom of the second split member 10b. In the valve box 10, partitioning walls 16a, 16b and 16c are provided across the valve rod 14 to divide the interior of the valve box into four chambers, i.e. a first chamber 17a including the first port 11a, a second chamber 17b including the second port 11b, a third chamber 17c including the third port lic, and a fourth chamber 17d including the fourth port 11d.

The partitioning walls 16a, 16b and 16c have holes 18a, 18b and 18c through which the valve rod 14 extend. The edges of the holes 18a, 18b and 18c serve as first, second and third valve seats 19a, 19b and 19c. The valve rod 14 carries valve bodies 20a and 20b adapted to be seated on the valve seats 19a, 19b and 19c. When the lower valve body 20b is seated on the second valve seat 19b as shown by solid line in FIG. 1, the upper valve body 20a is separate from the first valve seat 19a. When the lower valve body 20b is seated on the third valve 19c while separating from the second valve seat 19b as shown by chain line in FIG. 1, the upper valve body 20a is seated on the first valve seat 19a. To keep water tightness, seals 21 are provided on the contact surfaces of the valve bodies 20a and 20b with the valve seats 19a, 19b and 19d.

The lid 10c of the valve box 10 has a cylindrical upper portion onto which is screwed a cylinder 22 having a lid. The valve rod 14 has its top end disposed in the cylinder 22 and has a piston 23 secured to its top end. The piston 23 is biased downwardly by a spring 24. On the side remote from the spring 24, the cylinder 22 has a port 25. When fluid pressure is applied to the cylinder through the port 25, the piston 23 is moved against the force of the spring 24. When the application of fluid pressure is stopped, the piston 23 is moved as shown by chain line by the spring 24. In the figure, numeral 26 indicates a bolt for adjusting the position of a spring support 27. The biasing force of the spring 24 is determined by the amount how deep the bolt 26 is threaded in.

Figure 2:
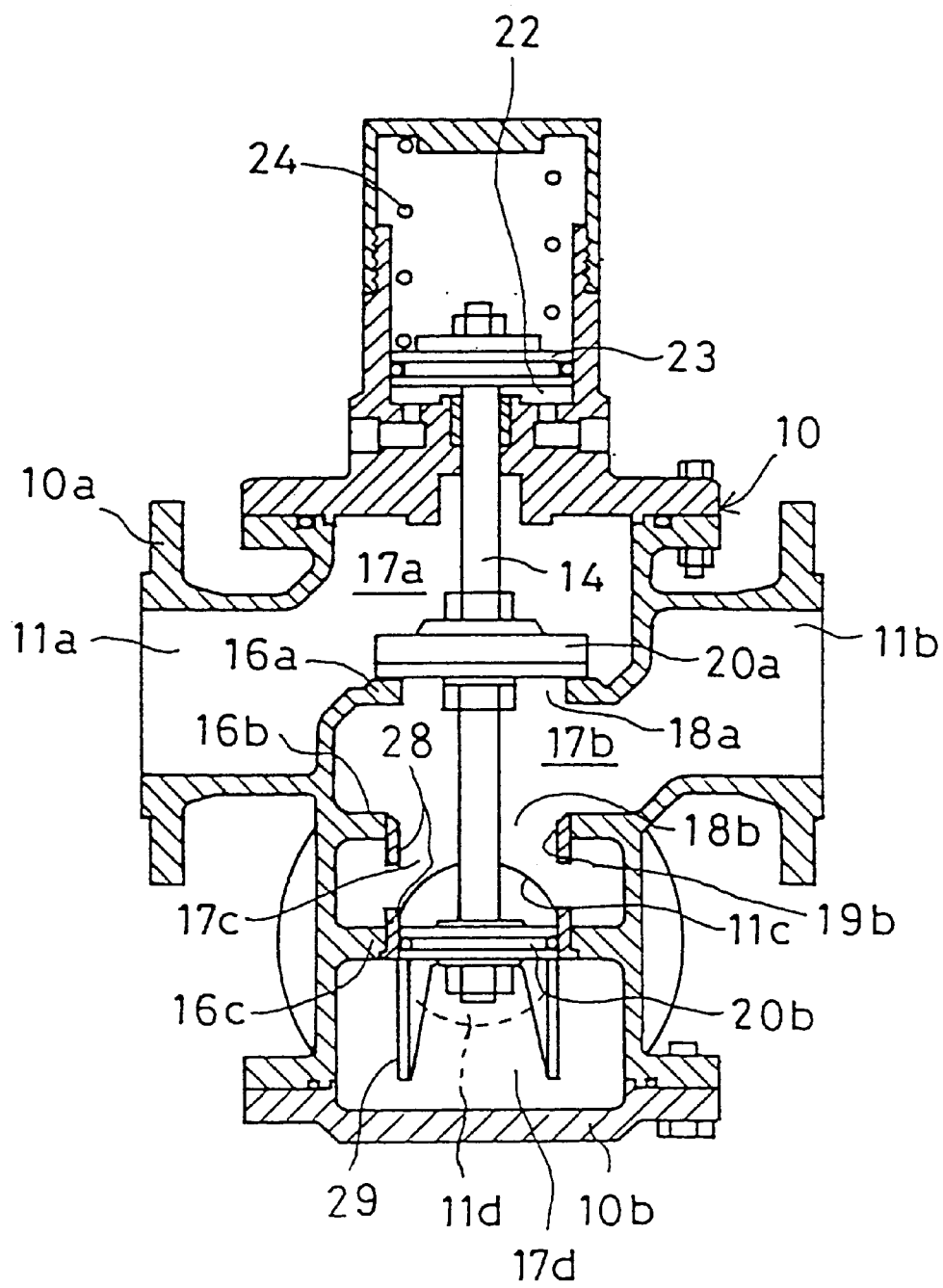
FIG. 2 is a sectional view of another embodiment of the four-port changeover valve.

FIG. 2 shows an embodiment in which the second split member 10b of the valve box 10 is turned 90 degrees so that the third and fourth ports 11c and 11d are perpendicular to the first and second ports 11a and 11b. This prevents the interference of the ports with flanges and shortens the vertical length of the entire valve. As shown, cylindrical sheets 28 as the second and third valve seats 19b and 19c are provided between the partitioning walls 16b and 16c and have holes in the periphery. The valve body 20b has a guide 29 slidable along the inner surfaces of the sheets 28. The provision of the guide 29 eliminates the necessity of the lower bearing 15b and thus contributes to the downsizing of the entire valve.

Figure 3:
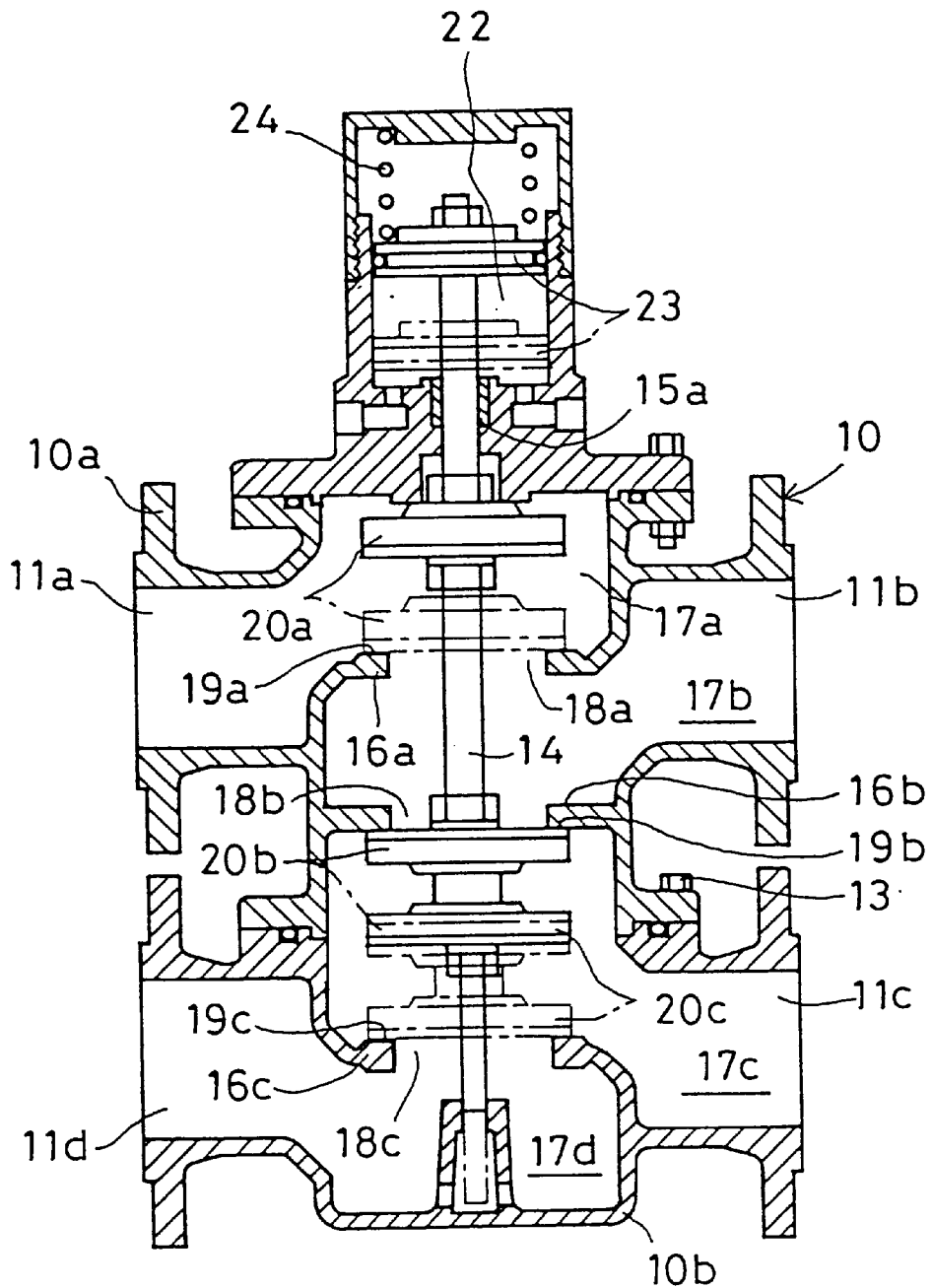
FIG. 3 is a sectional view of a further embodiment of the four-port changeover valve.

In the embodiment shown in FIG. 3, valve bodies 20a, 20b and 20c are provided for the respective valve seats 19a, 19b and 19c. Solid lines and chain lines indicate a normal state and an emergency state, respectively. By providing the separate valve bodies, it is not necessary to move a single valve body between valve seats. It is thus possible to shorten the stroke of the valve rod 14 when the valve is opened and closed. This arrangement is effective for a large-aperture valve in which the distance between valve seats is long. In the determined by the amount how deep the bolt 26 is threaded in.

FIG. 2 shows an embodiment in which the second split member 10b of the valve box 10 is turned 90 degrees so that the third and fourth ports 11c and 11d are perpendicular to the first and second ports 11a and 11b. This prevents the interference of the ports with flanges and shortens the vertical length of the entire valve. As shown, cylindrical sheets 28 as the second and third valve seats 19b and 19c are provided between the partitioning walls 16b and 16c and have holes in the periphery. The valve body 20b has a guide 29 slidable along the inner surfaces of the sheets 28. The provision of the guide 29 eliminates the necessity of the lower bearing 15b and thus contributes to the downsizing of the entire valve.

In the embodiment shown in FIG. 3, valve bodies 20a, 20b and 20c are provided for the respective valve seats 19a, 19b and 19c. Solid lines and chain lines indicate a normal state and an emergency state, respectively.

By providing the separate valve bodies, it is not necessary to move a single valve body between valve seats. It is thus possible to shorten the stroke of the valve rod 14 when the valve is opened and closed. This arrangement is effective for a large-aperture valve in which the distance between valve seats is long. In the embodiments of FIGS. 2 and 3, too, the spring support 27 and the adjusting bolt 26 may be used.

Figure 4:
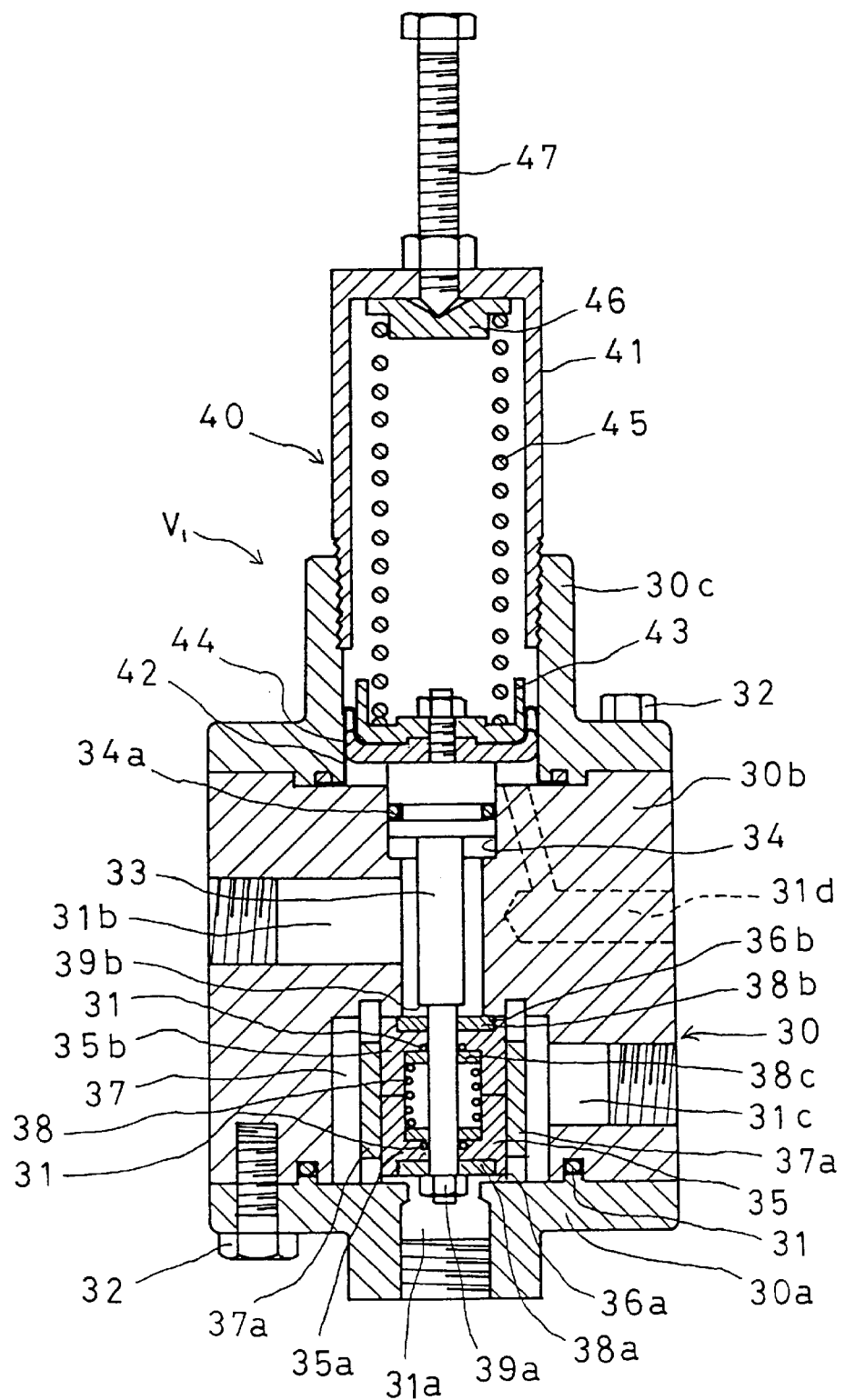
FIG. 4 is a sectional view of one embodiment of the three-way valve.
Figure 5:
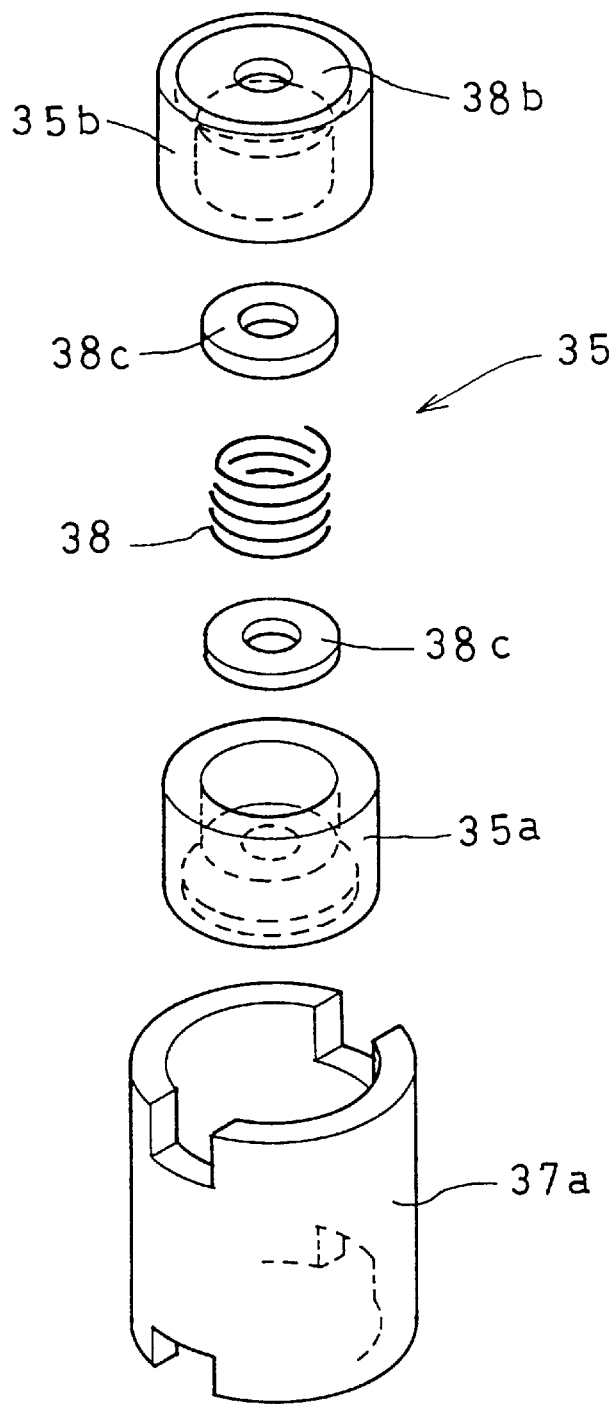
FIG. 5 is a partial exploded perspective view of this embodiment.
Figure 6A:
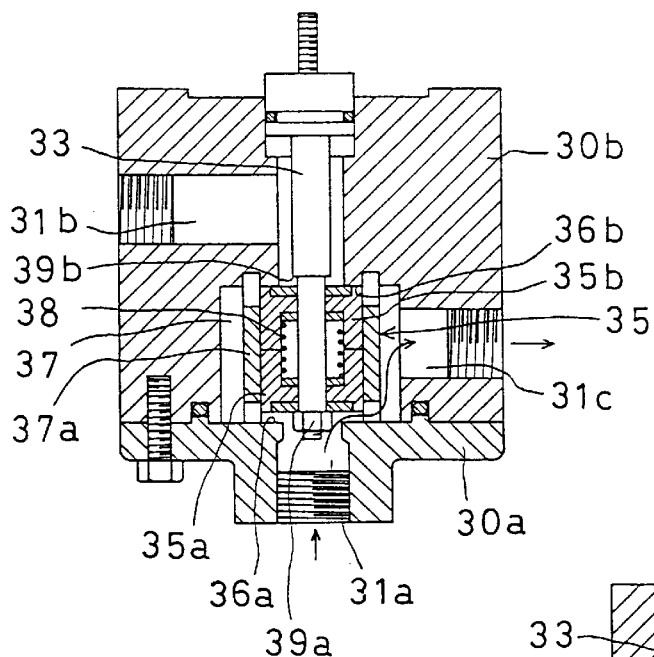
FIGS. 6A–6C illustrate the operation of this embodiment.

Now the three-way valve embodiments are described. FIGS. 4–6 show one of such embodiments. As shown, the valve of this embodiment has a valve box 30 comprising a first piece (split member) 30a having a first port 31a, and a second piece (split member) 30b having a second port 31b and a third port 31c. The pieces 30a, 30b and a lid 30c forming a part of a cylinder 40 to be described later are tightened by bolts 32 provided circumferentially at angular intervals with O-rings 31 disposed therebetween.

The second piece 30b has in its central bottom a cylindrical recess which, closed by the first piece 30a, defines a valve chest 37. The first port 31a opens at its bottom, the second port 31b at its top, and the third port 31c at its side. The edges of the openings of the first port 31a and the second port 31b serve as the first valve seat 36a and the second valve seat 36b, respectively.

A valve rod 33 is inserted in the center of the valve box 30 (valve chest 37). The valve rod 33 is slidably received in a hole 34 formed in the second piece 30b through an O-ring 34a. A valve body 35 slidably fits around the valve rod 33. As the valve body 35 moves, rubber sheets 38a and 38b provided at the top and bottom of valve body 35 are brought into and out of contact with the valve seats 36a and 36b. That is, with the vertical movement of the valve body 35, the first and second port 31a and 31b are selectively opened and closed.

The valve body 35 is split at its intermediate portion into two split members 35a and 35b between which is disposed a coil spring 38 through an O-ring presser 38c. The spring 38 biases the split members 35a, 35b away from each other. A nut 39a is screwed onto the tip of the valve rod 33 to prevent the valve body 35 from coming off the valve rod 33. The valve rod 33 has a shoulder 39b at its intermediate portion to prevent the valve body 35 from moving beyond the shoulder. That is, the nut 39a and the shoulder 39b serve as engaging portions for the valve body 35. The engaging portions 39a, 39b restrict the sliding movement of the split members 35a, 35b in the direction away from each other.

The gap between the engaging portions 39a and 39b are wider than the distance between the first and second valve seats 36a and 36b. Thus, when the valve rod 33 is in its lowest position, the second split member 35a is seated on the valve seat 36a as shown in FIG. 6C and the first split member 35b is away from the valve seat 36b. With the valve rod 33 at higher level (FIG. 6B), both the split members 35a and 35b are seated on the valve seats 36a and 36b. With the valve rod 33 at highest level (FIG. 6A), the first split member 35b is seated on the valve seat 36a whereas the second split member 35a is away from the valve seat 36a. That is, it is impossible that both the split members 35a and 35b are away from the valve seats 36a and 36b simultaneously. Further, as the valve rod 33 moves, one of the split members 35a and 35b is separated from the valve seat 36a or 36b. This opens the port 31a or 31b. The split members 35a, 35b move smoothly while being restricted by the guide 37a.

A cylinder 40 is formed by the lid 30c and a cylindrical member 41 threaded into the lid 30c. A diaphragm 42 (BELLOFRAM made by Fujikura Rubber Co., Ltd.) is stretched in the cylinder 40. It has its edge gripped by the second piece 30b and the lid 30c to partition the interior of the cylinder 40. Through its center, the valve rod 33 extends. A piston 43 and a retainer 44 are fixed to the valve rod 33 through the diaphragm 42. Thus, the valve rod 33 is moved up and down through the piston 43 as the diaphragm 42 deflects.

The cylindrical member 41 contains a spring 45 having its bottom end abutting the piston 43 and the other end supported on a spring support 46. The spring support 46 compresses the spring 45 according to how deep a bolt 47 is threaded in. Thus, the bolt 47 determines the biasing force of the spring 45, and thus the movement of the valve rod 33. Pressure is applied to the diaphragm 42 through a pilot port 31d formed in the second piece 30b.

Figure 7A:
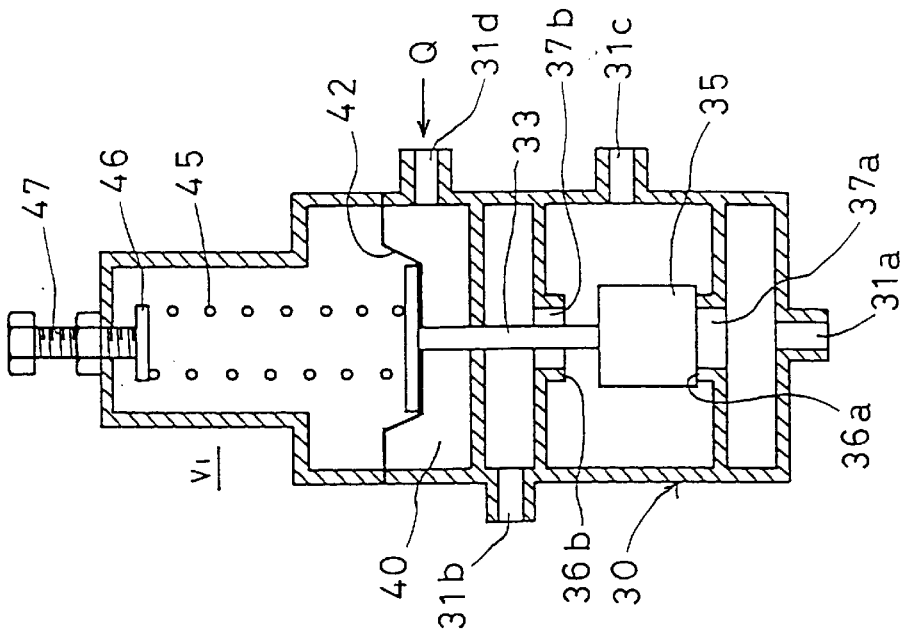
FIGS. 7A and 7B are simplified views of this embodiment.

As shown in FIG. 7, when pilot pressure Q such as the water main pressure is applied to the diaphragm 42 and the pilot pressure Q is higher than the pressure set by the spring 45, the diaphragm 42 is deflected upward by the pressure Q as shown in FIG. 7A, so that the valve rod 33 rises, seating the valve body 35 on the second valve seat 36b. The first port 31a thus communicates with the third port 31c, and the second port 31b and the third port 31c are shut off from each other (see FIG. 6A).

Figure 6B:
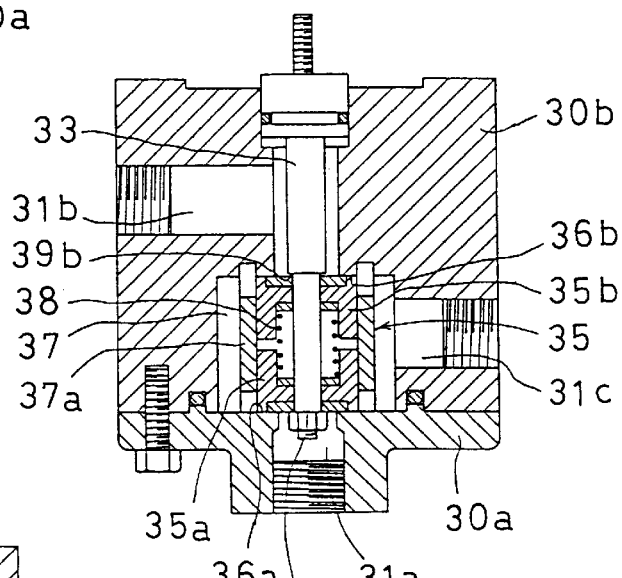
Figure 6C:
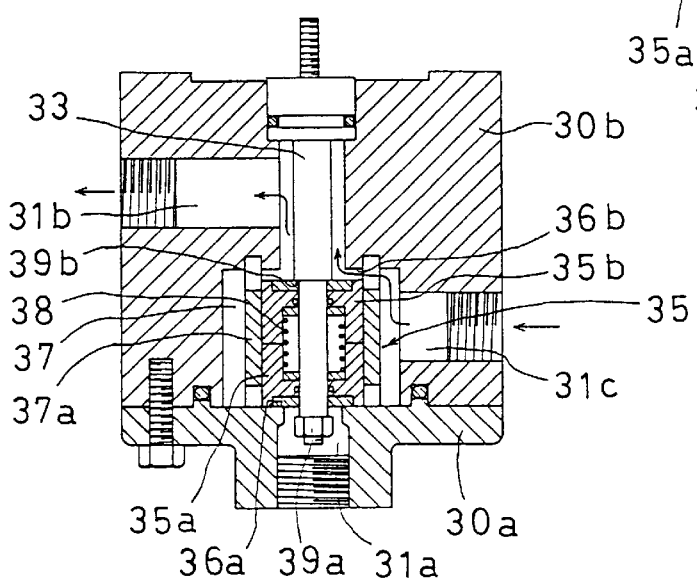
Figure 7B:
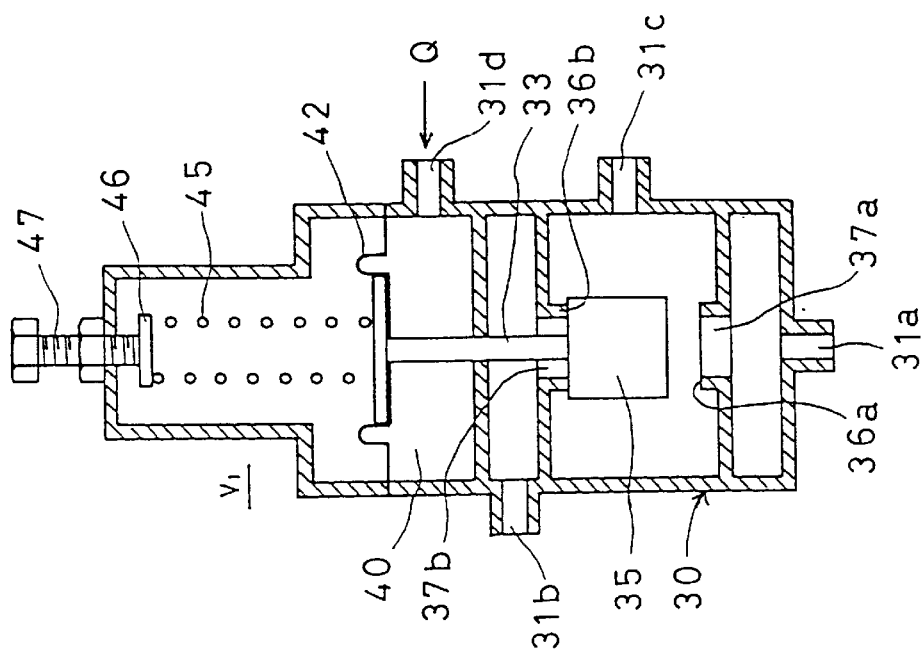

If the pilot pressure P drops below the pressure set by the spring 45 due to an earthquake or for any other reason, both split members 35a, 35b shown in FIG. 6B are pressed against the valve seats 36a, 36b first, and then the diaphragm 42 is deflected downward by the spring 45 as shown in FIG. 7B, so that the valve rod 33 is pushed down and the split member 35b separates from the second valve seat 36b. The second port 31b thus communicates with the third port 31c (see FIG. 6C).

In this embodiment, the pilot pressure Q may be applied to the diaphragm 42 from above in the cylinder 40 and the piston 43 be biassed upward with the spring 45 expanded. In this case, the split member 35a is separated from the first valve seat 36a and the split member 35b is pressed against the second valve seat 36b by the biasing force of the spring 45.

Figure 8:
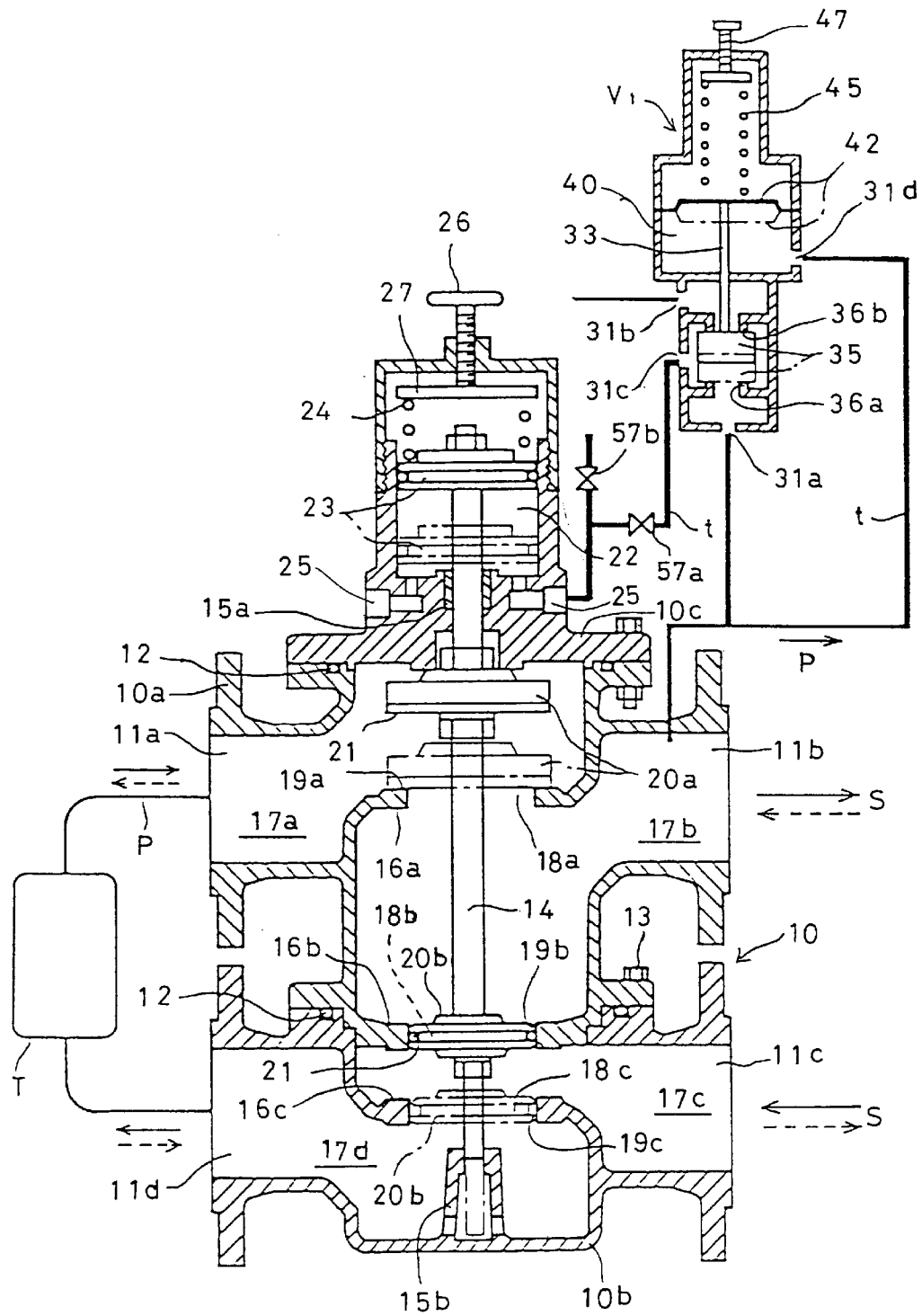
FIG. 8 is a sectional view of the assembly including the four-port valve of FIG. 1 and the pilot valve of FIG. 7.
Figure 14:
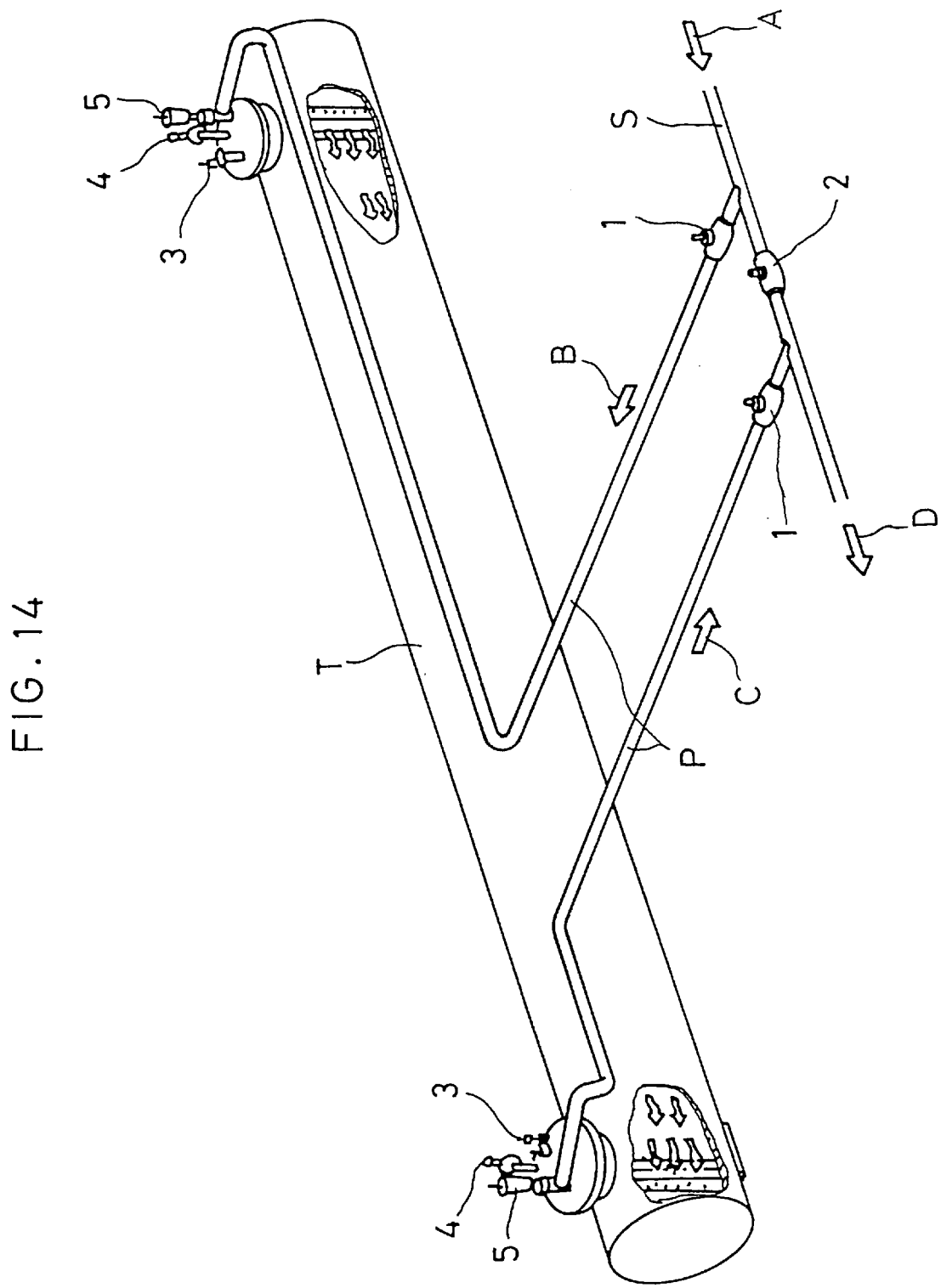
FIG. 14 is a view showing an emergency water storage tank facility.
Figure 15:
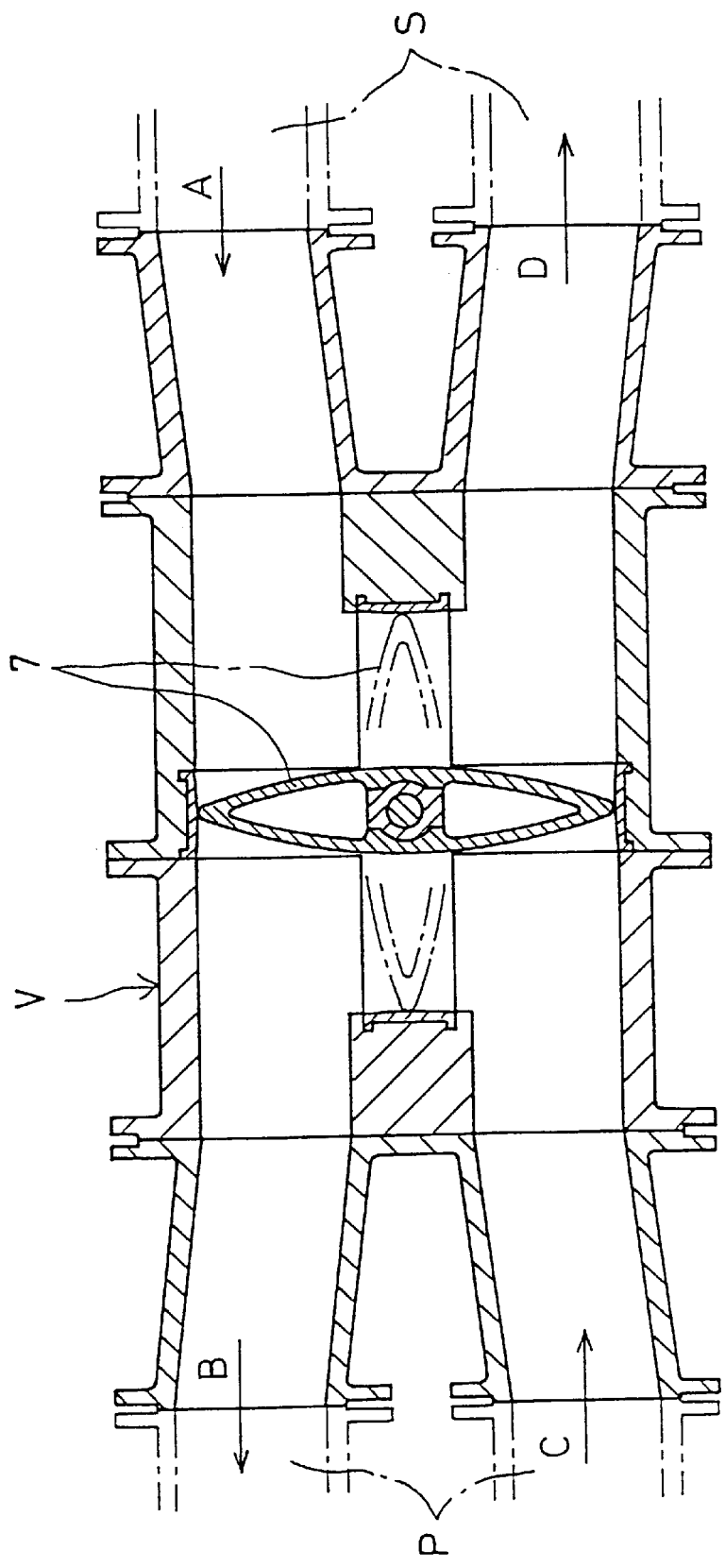
FIG. 15 is a sectional view of a conventional four-port changeover valve.

FIG. 8 shows an embodiment in which the above-described four-port changeover valve is used in the emergency water storage tank structure shown in FIG. 14, and the above three-way valve is used as the pilot valve of its changeover valve. In this embodiment, the first and fourth ports 11a, 11d of the four-port changeover are connected to the bypass pipes P connected to the tank T, and the second and third ports 11b, 11c are connected to the water main S.

The port 25 of the cylinder 22 of the four-port changeover valve is connected to the third port 31c of the three-way valve V1. Manual valves 57a, 57b are provided in its pipe line t. Normally, the manual valve 57a is kept open while the other manual valve 57b is closed. Pressurized water flowing through the water main S is introduced into the pilot port 31d and the first port 31a of the three-way valve V1. The second port 31b is open, while the other port 25 of the cylinder 22 is closed.

In a normal state, the water pressure in the water main S, which is higher than a predetermined value, is applied in the cylinder 40 of the pilot valve (three-way valve) V1, so that the diaphragm 42 is deflected upward as shown by solid line in FIG. 8, and the valve body 35 is pressed against the second valve seat 36b. Thus, the water pressure in the water main S is applied in the cylinder 22 through the first port 31a and the third port 31c, so that, as shown by solid line in this figure, the piston 23 moves upward (to its upper limit) while compressing the spring 24. The valve rod 14 thus moves up, seating the valve body 20b on the second valve seat 19b while keeping the valve body 20a separate from the first valve seat 19a.

In this state, the first chamber 17a and the second chamber 17b, and the third chamber 17c and the fourth chamber 17d are in communication. Water in the water main S thus flows, as shown by solid line and chain line in FIG. 8, through the first port 11a and the second port 11b or through the third port 11c and the fourth port 11d and then through the tank T.

In the case of an emergency such as an earthquake, the water pressure in the water main S will drop, so that, as shown by chain line in this figure, the diaphragm 42 of the pilot valve VI is deflected downward by the spring 45, so that the valve body 35 separates from the second valve seat 36b and is pressed against the first valve seat 36a. Thus, the interior of the cylinder 22 is opened to the atmosphere through the third port 31c and the second port 31b, while the piston 23 is pushed down (to its lower limit) by the spring, so that the valve rod 14 is pushed down. The valve body 20b thus separates from the second valve seat 19b and is seated on the third valve seat 19c, while the valve body 20a is seated on the first valve seat 19a. In this state, the second chamber 17b and the third chamber 17c are in communication, while the first and fourth chambers 17a and 17d are shut off from the second and the third chambers 17b and 17c. Water in the water main S thus flows between the second port 11b and the third port 11c, while the water in the tank T will never flow out.

In this state, when the water pressure in the water main S increases to the predetermined value with the tank T closed, the water main pressure is applied in the cylinder 22 through the pilot valve V1. Under the water pressure, the piston 23 is moved up to the position shown by solid line in this figure. That is, even if the water pressure in the water main S temporarily drops for one reason or another, water will automatically begin to flow into the tank again.

In an emergency, the tank T can be shut off from the water main S by closing the manual valve 57a and opening the other manual valve 57b. The manual valves 57a, 57b may be electromagnetic valves. If they are electromagnetic valves, the valve 57a is communicated not through the pilot valve V1 but directly with the port 17b, and the valves 57a, 57b are activated by an earthquake signal. That is, by the earthquake signal, the valve 57a is closed and the valve 57b opens, so that the valve bodies 20a, 20b are positioned as shown by arrows of this figure by the spring to perform the above operation.

Figure 9:
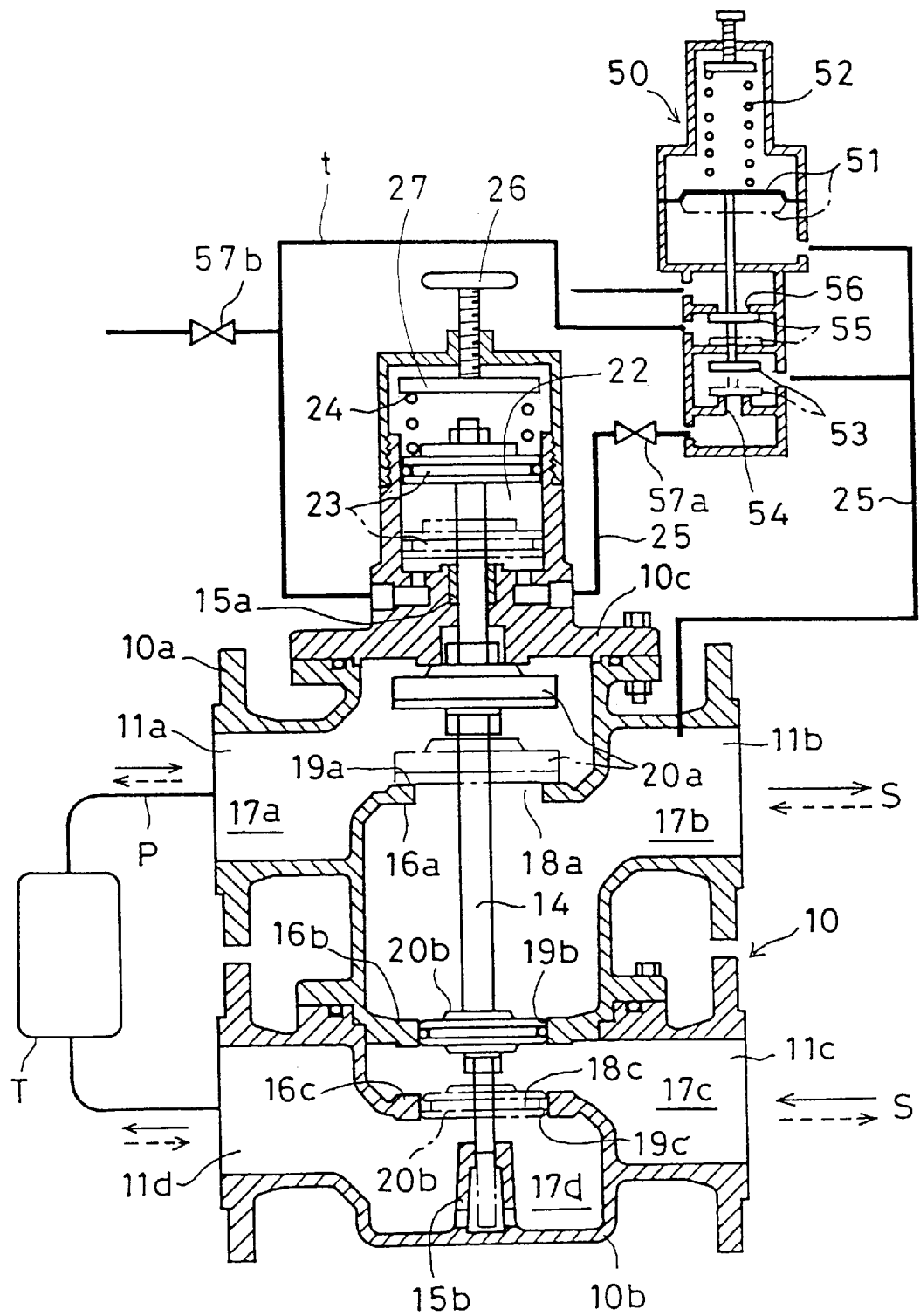
FIG. 9 is a sectional view of the assembly including the four-port valve of FIG. 1 and another embodiment of the pilot valve.

In the embodiment shown in FIG. 9, the pilot valve V1 is a valve other than the above-mentioned three-way valve. The pilot valve 50 is connected to the ports 25 of the cylinder 22 by pipes t in which are provided a first and a second electromagnetic valve 57a, 57b. In a normal state, the first electromagnetic valve 57a is open and the second electromagnetic valve 57b is closed. The diaphragm 51 is thus deflected against the force of a spring 52 by water pressure as shown by solid line, thus separating the first valve body 53 from the first valve seat 54 while seating the second valve body 55 on the second valve seat 56. Water pressure also acts on the piston 23, thus raising the piston 23 against the force of the spring 24. The valve bodies 20a, 20b in the valve box 10 move to a normal position as shown by solid line.

In an emergency, by the detection signal, the first electromagnetic valve 57a is closed and the second electromagnetic valve 57b is opened, so that the water pressure in the second chamber 11b (water main S) drops. This causes the diaphragm 51 to be deflected downward by the spring 52, seating the first valve body 53 on the first valve seat 54 to block water flow into the cylinder 22. On the other hand, the second valve body 55 separates from the second valve seat 56, opening the cylinder 22. Thus, the valve rod 14 is pushed down by the spring 24, causing the valve bodies 20a, 20b in the valve box 10 to assume an emergency position as shown by the chain line.

In this embodiment, too, even if the valve falls into an emergency state temporarily, as soon as the emergency detection signal disappears and water pressure of a predetermined level is applied again to the pilot valve 50, the valve assembly returns to a normal state by the above action.

In this embodiment, water pressure in the cylinder 22 is separately adjusted to change over the flow path by the pilot valve 50 and the two electromagnetic valves 57a, 57b. But self-pressurization by the water pressure in the water main S is preferentially carried out. Thus, the electromagnetic valves 57a, 57b may be omitted. Instead of the electromagnetic valves 57a, 57b, manual valves may be used. The cylinder 22 may be operated only by the electromagnetic valves 57a, 57b and the manual valves, too.

Figure 10:
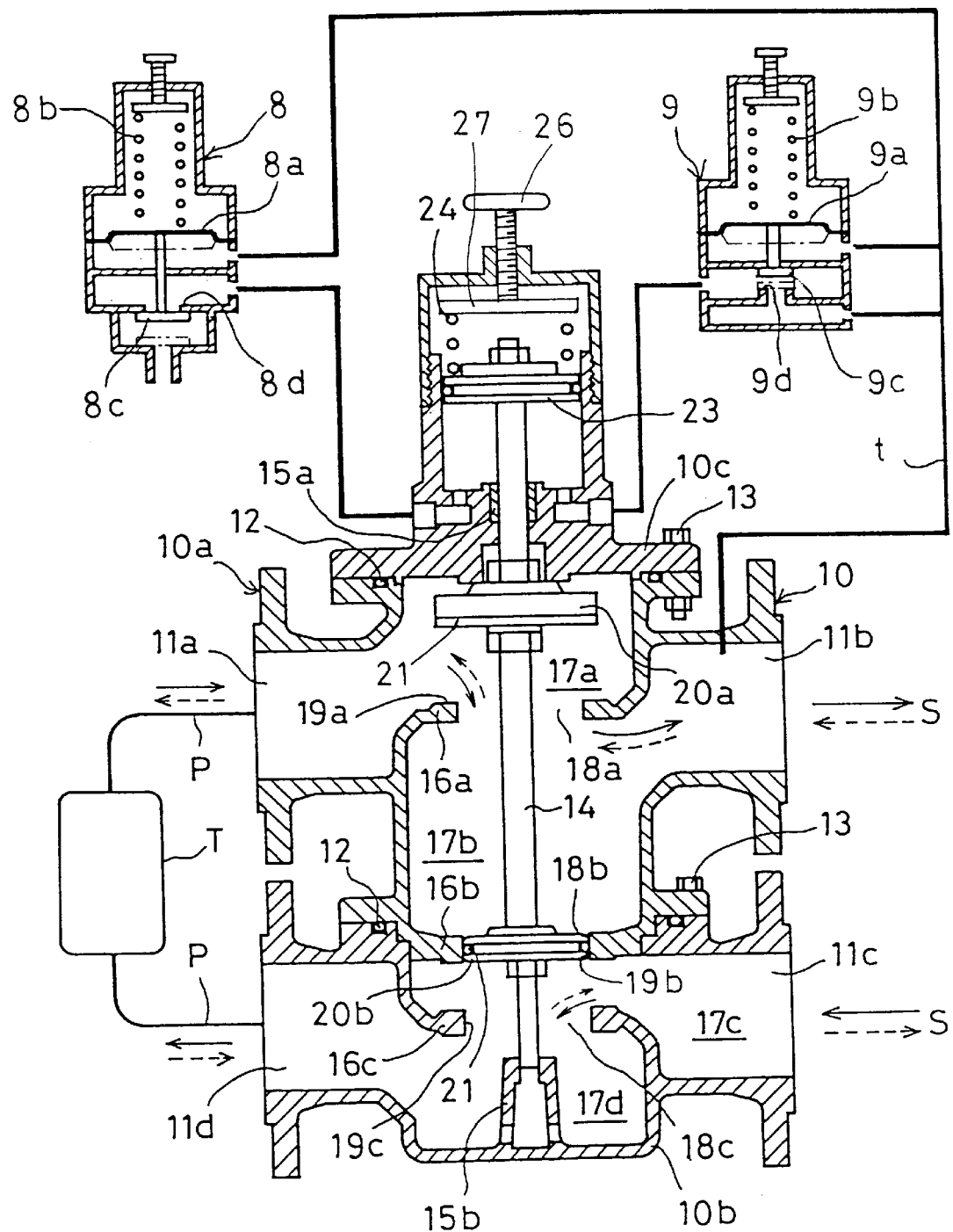
FIG. 10 is a sectional view of the assembly including the four-port valve of FIG. 1 and two conventional pilot valves of FIG. 16.
Figure 16A:
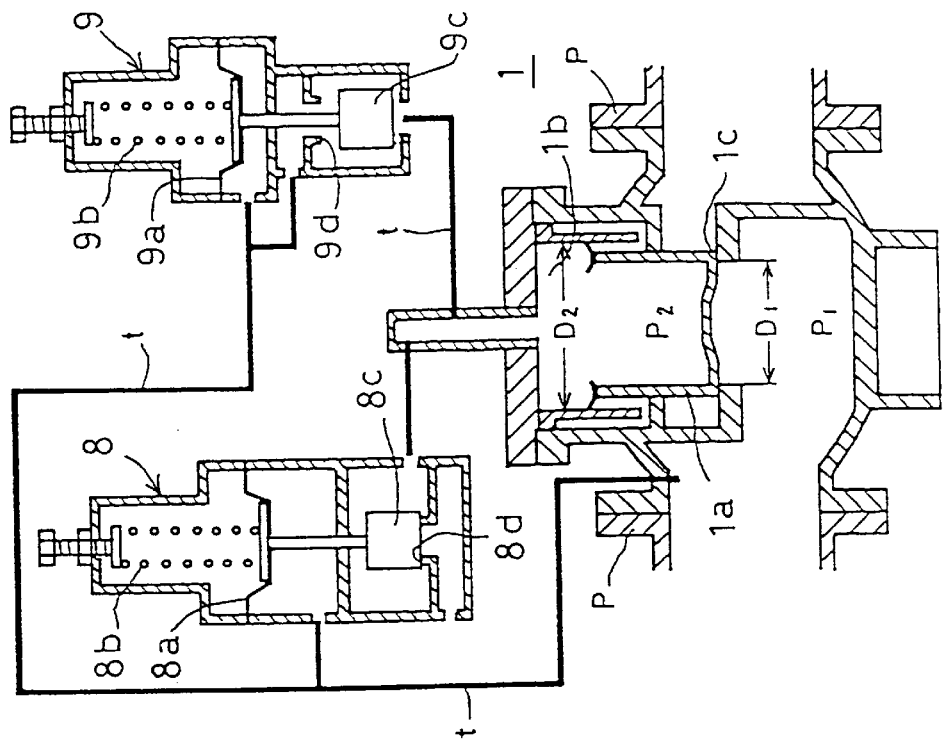
FIGS. 16A and 16B are views showing conventional changeover valve arrangements.
Figure 16B:
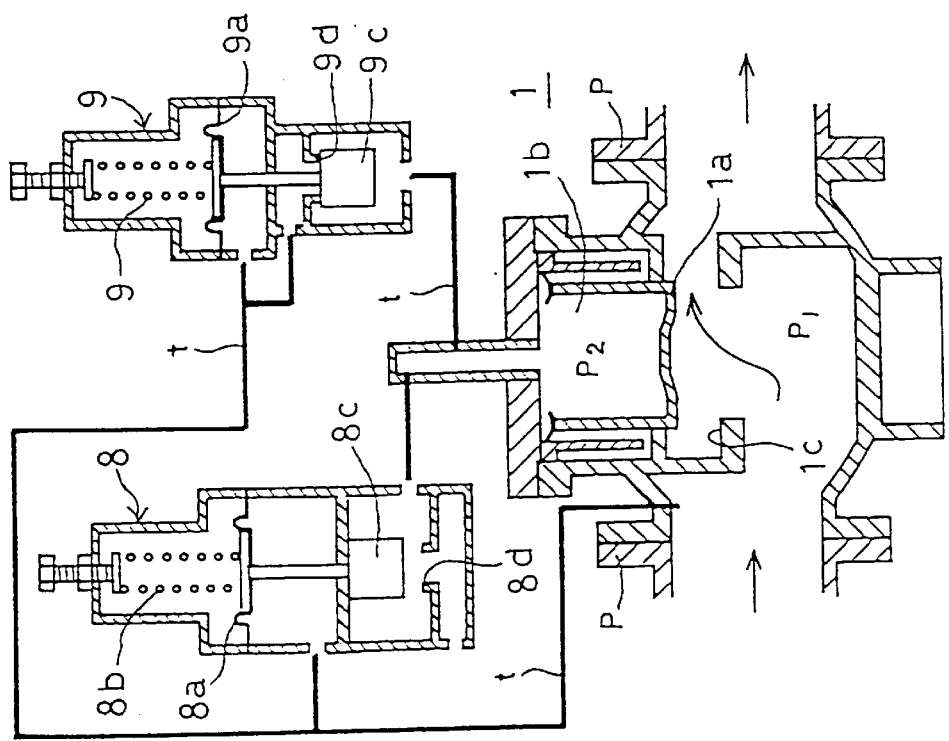
Figure 17A:
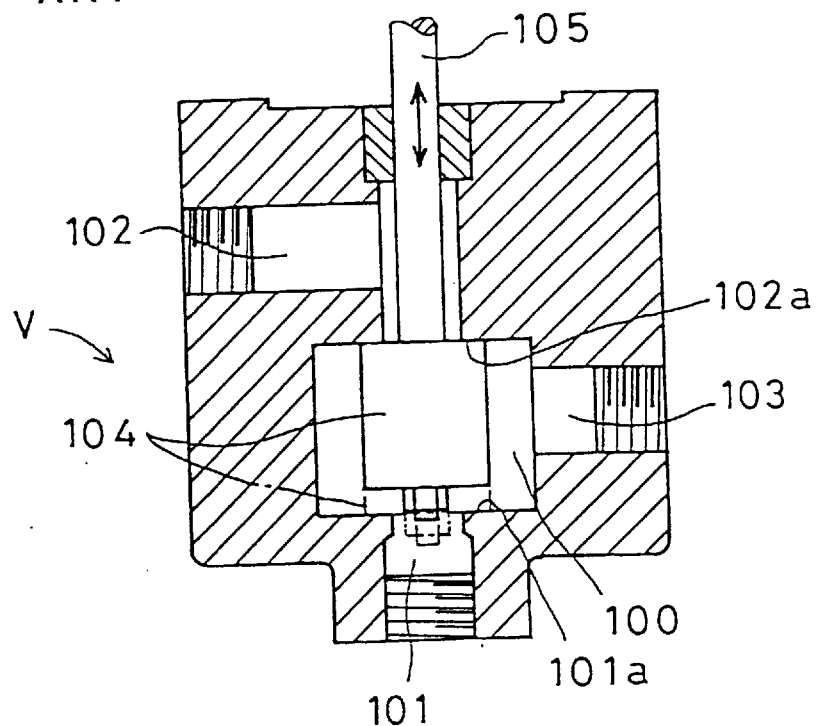
FIGS. 17A and 17B are views showing the operation of a conventional three-way valve.
Figure 17B:
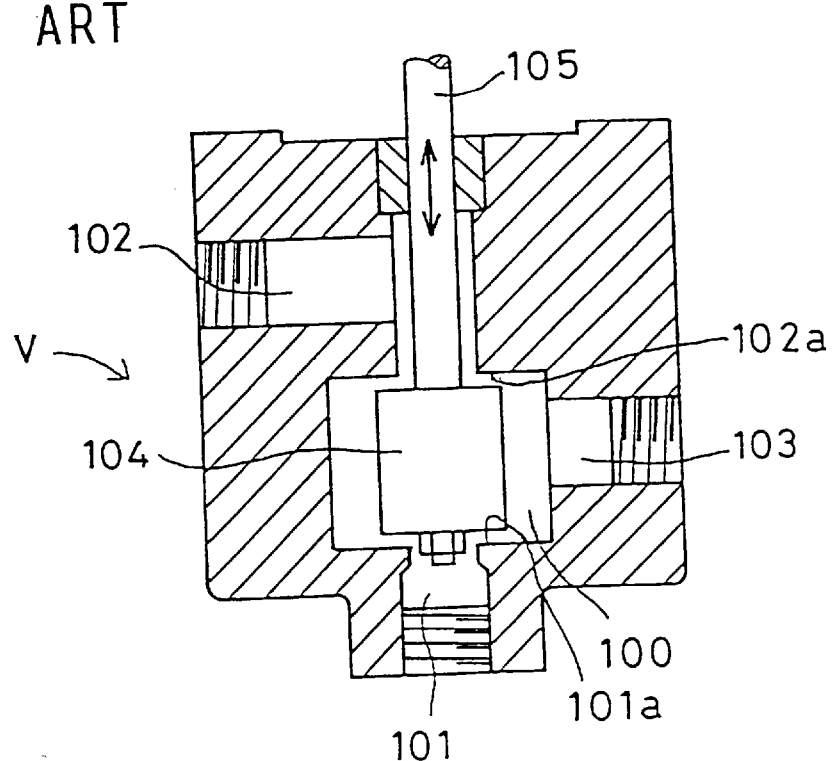

In the embodiment shown in FIG. 10, the four-port changeover valve is operated by the pilot valves 8, 9 shown in FIG. 16. By the action of the pilot valves 8, 9, the piston 23 is moved to perform the same function as described above.

Figure 11:
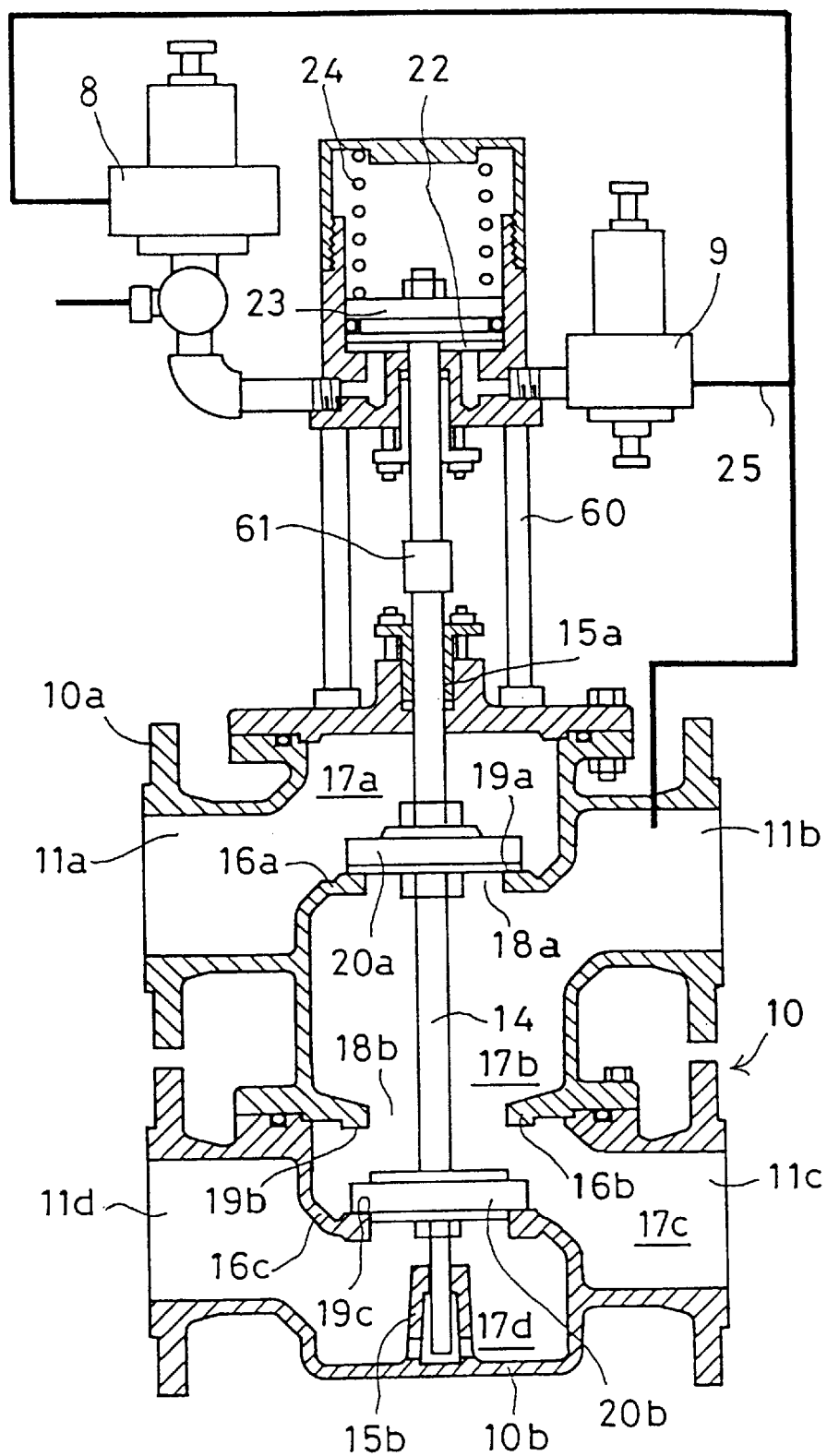
FIG. 11 is a sectional view of the assembly including a variant of the four-port valve of FIG. 1 and two conventional pilot valves of FIG. 16.

In the embodiment of FIG. 11, the lower valve body 20b has a modified shape. This valve body 20b opens and closes the valve by seating on and separating from the bottom surface of the second valve seat 19b or the top surface of the third valve seat 19c. If, for one reason or another, the cylinder 22 cannot be provided directly in the valve box lid 10c, it may be provided at a predetermined height by use of rods 60 having a suitable length, as shown in this figure. In the figure, numeral 61 indicates a coupling for coupling the valve rod 14.

In the embodiment of FIG. 12, the three-way valve V1 is used in combination with the shutoff valve 1 shown in FIG. 16. In the embodiment of FIG. 13, the three-way valve V1 is used in combination with the on-off valve 2 shown in FIG. 16. Since these valves 1, 2 are structurally the same as described above, their description is omitted.

In the case of the shutoff valve 1 shown in FIG. 12, the water pressure in the pipe (bypass) P is introduced into the pilot port 31d and the second port 31b of the pilot valve V1, with the third port 31c connected to the cylinder 1b and the first port 31a open.

With this valve assembly, in a normal situation, as shown in FIG. 12A, the diaphragm 42 is deflected upward by the water pressure Q, so that the first valve seat 36a opens, thus opening the interior of the cylinder 1b into the outer air. Since the relation P1>P2 is met in this state, the cylinder valve 1a rises, opening the valve seat 1c with the shutoff valve 1 kept open. Water thus flows through the pipe P.

If the water pressure Q drops below a pressure set by the spring 45 due e.g. to an earthquake, the diaphragm 42 deflects downward as shown in FIG. 12B, separating the valve body 35 from the second valve seat 36b and seating it on the first valve seat 36a. Thus, the water pressure Q in the pipe P is applied in the cylinder 1b through the third port 31c. Thus, in the same manner as above, the cylinder valve 1a is lowered into contact with the valve seat 1c, thus closing the pipe P.

When the water pressure in the pipe P rises to the pressure set by the spring 45, the diaphragm 42 will now deflect upward, allowing the pilot valve V1 to return to the position shown in FIG. 12A. The pipe P is thus closed.

In the case of the on-off valve 2 shown in FIG. 13, the water pressure Q in the pipe (water main) S is introduced into the pilot port 31d of the pilot valve V1 and the first port 31a with the third port 31c connected to the cylinder 1b and the second port 31b open.

This valve assembly is operated in reverse to the operation of the shutoff valve 1. That is, in a normal state, the diaphragm 42 is deflected upward by water pressure Q, so that the valve body 35 is pressed against the second valve seat 36b, while the first valve seat 36a is open. Thus, the water pressure Q is applied in the cylinder 1b. This causes the cylinder 1b to be lowered into contact with the valve seat 1c, thus closing the pipe S.

If the water pressure Q drops below the pressure set by the spring 45 due e.g. to an earthquake, the diaphragm 42 is deflected downward as shown in FIG. 13B, causing the valve body 35 to separate from the second valve seat 36b and seat on the first valve seat 36a. The water pressure in the pipe S is thus not applied in the cylinder 1b, with the interior of the cylinder 1b open to the outer air through the third port 31c. The cylinder valve 1a thus rises, separating from the valve seat 1c. The pipe S thus opens.

When the water pressure rises above the set pressure, the diaphragm 42 deflects upward, allowing the pilot valve to return to the position of FIG. 13A. The pipe S is thus closed.

According to this invention, flow path is changed over by axially moving the valve rod of the four-port changeover valve. Water can thus be stopped completely. The valve is structurally simple and compact.

By using this valve in an emergency water storage tank facility, flow path can be changed over with only the valve according to this invention. The valve of this invention is easy to operate and can be used as any of self-pressurized, manual and electric signal-responsive valves.

The three-way valve of this invention eliminates an unstable state in which water flow direction cannot be changed over because water is flowing in two directions. By using this valve as e.g. a pressure-responsive pilot valve, its changeover action can be made clear.

In an arrangement in which the return-to-normal and shutoff operations can be performed with a single valve as a flow path changeover pilot valve in an emergency water storage tank structure, the set pressure can be adjusted easily, and the valve is less likely to fail. Since the number of valves used is small, the number of pipes used is also small. This is economically desirable.

What is claimed is:

1. A four-port changeover valve provided in a bypass pipe through which a water main is connected to an emergency water storage tank for opening and closing communication between said water main and said bypass pipe to selectively direct water flowing through said water main into said bypass pipe or not, said four-port changeover valve comprising a valve box, a valve rod axially slidably mounted in said valve box, three partitioning walls provided across said valve rod at three axial points of said valve rod to divide the interior of said valve box into axially arranged first to fourth chambers each formed with a port, said partitioning walls each being formed with a hole through which said valve rod extends, a first valve seat provided along the edge of a first hole through which said first and second chambers communicate with each other, a second valve seat provided along the edge of a second hole through which said second and third chambers communicate with each other, a third valve seat provided along the edge of a third hole through which said third and fourth chambers communicate with each other, a pair of valve bodies fixedly provided on said valve rod for opening and closing said holes by coming into and out of contact with said first to third valve seats, said valve bodies being arranged such that when they abut said first and third valve seat, they are separate from said second valve seat, and when they abut said second valve seat, they are separate from said first and third valve seats; and said bypass pipe being connected to said first chamber and said fourth chamber, and said water main connected to said second and third chambers, said valve box having a cylinder in which is inserted said valve rod, a piston being provided in said cylinder in operative association with said valve rod, a spring being provided to urge said piston such that one of said valve bodies separates from said second valve seat and said valve bodies are pressed against said first and third valve seats, and said piston being urged in a direction against the force of said spring by water pressure in said water main, wherein in a normal situation when the water pressure in said water main is high, said valve bodies are separated from said first and third valve seats, and said one of said valve bodies is pressed against said second valve seat by the water pressure, and in an emergency when the water pressure in said water main is low, said valve bodies are pressed by said spring against said first and third valve seats and said one of said valve bodies is separated from said second valve seat.

2. A four-port changeover valve for an emergency water storage tank as claimed in claim 1, wherein said cylinder is provided with a pilot valve to introduce water pressure in said water main into said cylinder in a normal state and to stop introduction of water pressure in said water main into said cylinder in an emergency.

3. A four-port changeover valve provided in a bypass pipe through which a water main is connected to an emergency water storage tank for opening and closing communication between said water main and said bypass pipe to selectively direct water flowing through said water main into said bypass pipe or not, as claimed in claim 1, wherein one of said valve bodies is so arranged as to selectively abut and separate on and from said second and third valve seats.

4. A four-port changeover valve provided in a bypass pipe through which a water main is connected to an emergency water storage tank for opening and closing communication between said water main and said bypass pipe to selectively direct water flowing through said water main into said bypass pipe or not, as claimed in claim 1, wherein said valve body is adapted to come into and out of contact with said second valve seat is small enough to pass through said first valve seat, and wherein said valve body adapted to come into and out of contact with said third valve seat is small enough to pass through said first and second valve seats.

5. In an emergency water storage tank facility wherein a water main is connected to an emergency water storage tank through a bypass pipe, and wherein a flow changeover valve is provided between said water main and said bypass pipe to open and close communication therebetween, thereby creating a first state in which water flowing through said water main flows through said bypass pipe and a second state in which it does not flow, a flow changeover valve assembly in which said flow changeover valve is provided with a pressure-responsive pilot valve, said pressure-responsive pilot valve comprising a three-way valve comprising a valve chest having first and second ports opposed to each other, and a third port between said first and second ports, said first and second ports having opening edges as a first and second valve seat, and a valve body adapted to selectively abut said valve seats, thus selectively opening communication between said first and third ports and communication between said second and third ports, said valve body being split into two split members substantially at its center with respect to the direction of movement thereof, one of said split members being adapted to abut one of said valve seats when the other of said split members is separate from the other of said valve seats, wherein a valve box forming said valve chest carries a cylinder in which is inserted said valve rod, wherein a diaphragm is provided in said cylinder so as to operate in association with said valve rod, wherein a pilot pressure is applied to said diaphragm, wherein a spring is provided to urge said diaphragm in a direction opposite to the direction in which said pilot pressure is applied to said diaphragm, wherein said valve body is alternately brought into and out of contact with said valve seats by axially moving said valve rod through said diaphragm by said pilot pressure or by said spring, and said flow changeover valve is operated by said pilot valve using the water pressure in said water main as the pilot valve.

6. A flow changeover valve assembly for use in an emergency water storage tank facility wherein a water main is connected to an emergency water storage tank through a bypass pipe, and wherein a flow changeover valve is provided between said water main and said bypass pipe to open and close communication therebetween, thereby creating a first state in which water flowing through said water main flows through said bypass pipe and a second state in which it does not flow;

wherein a flow changeover valve assembly is provided in which said flow changeover valve is provided with a pressure-responsive pilot valve, and said flow changeover valve is operated by said pilot valve using the water pressure in said main as the pilot valve;

wherein said flow changeover valve is a four-port changeover valve comprising a valve box, a valve rod axially slidably mounted in said valve box, three partitioning walls provided across said valve rod at three axial points of said valve rod to divide the interior of said valve box into axially arranged first to fourth chambers each formed with a port, said partitioning walls each being formed with a hole through which said valve rod extends, a first valve seat provided along the edge of a first hole through which said first and second chambers communicate with each other, a second valve seat provided along the edge of a second hole through which said second and third chambers communicate with each other, a third valve seat provided along the edge of a third hole through which said third and fourth chambers communicate with each other, a pair of valve bodies fixedly provided on said valve rod for opening and closing said holes by coming into and out of contact with said first to third valve seats, said valve bodies being arranged such that when they abut said first and third valve seat, they are separate from said second valve seat, and when they abut said second valve seat, they are separate from said first and third valve seats, wherein said bypass pipe is connected to said first and fourth chambers, wherein said water main is connected to said second and third chambers, wherein said valve box has a cylinder in which is inserted said valve rod, wherein a piston is provided in said cylinder to operate in association with said piston, wherein a spring is provided to urge said piston such that one of said valve bodies separates from said second valve seat while said valve bodies abut said first and third valve seats, and wherein the water pressure in said water main is applied to said piston in a direction against the biasing force of said spring, whereby in a normal state when the water pressure is high, said valve bodies are separated from said first and third valve seats, and said one of said valve bodies is pressed by said spring against said second valve seat by the water pressure, and in an emergency when the water pressure is low, said valve bodies are pressed against said first and third valve seats and said one of said valve bodies is separated from said second valve seat.

7. A flow changeover valve assembly as claimed in claim 6, wherein one of said valve bodies is so arranged as to selectively abut and separate on and from said second and third valve seats.

8. A flow changeover valve assembly as claimed in claim 6, wherein said valve body is adapted to come into and out of contact with said second valve seat is small enough to pass through said first valve seat, and wherein said valve body adapted to come into and out of contact with said third valve seat is small enough to pass through said first and second valve seats.

* * * * *